United States Patent [19]

Pasahow et al.

[11] 4,199,809
[45] Apr. 22, 1980

[54] PROGRAMMABLE DATA TERMINAL SET

[75] Inventors: Edward J. Pasahow; Carlos Nuese, both of San Diego, Calif.

[73] Assignee: The United States of America as represented by the Secretary of the Navy, Washington, D.C.

[21] Appl. No.: 674,025

[22] Filed: Apr. 5, 1976

[51] Int. Cl.² .................. G06F 15/16; H04L 27/02
[52] U.S. Cl. ........................... 364/200; 371/37; 375/9; 375/50
[58] Field of Search ............ 340/172.5; 325/30, 55, 325/60; 343/5 DP, 203; 179/2 DP; 364/200 MS File

[56] References Cited

U.S. PATENT DOCUMENTS

| | | | |
|---|---|---|---|
| 3,307,152 | 2/1967 | Robbins | 340/172.5 |
| 3,648,256 | 3/1972 | Paine | 340/172.5 |
| 3,665,417 | 5/1972 | Low | 340/172.5 |
| 4,014,004 | 3/1977 | Fuller | 340/172.5 |

Primary Examiner—Raulfe B. Zache
Attorney, Agent, or Firm—R. S. Sciascia; G. J. Rubens; H. Fendelman

[57] ABSTRACT

An operator console, a general purpose digital computer and a radio set interface are connected to perform the modulation and demodulation of the differential coherent quadrature phase shift signal used to transmit the digital information over a computer-to-computer radio link. The console is used to initiate communications and to control and monitor link operation. The computer performs all of the signal processing and control functions. The radio set interface performs analogue-to-digital (A/D) and digital-to-analogue (D/A) conversions for the received and transmitted signals, respectively. The programmable data terminal set (PDTS) also controls the data link operation and sequencing and tests its own performance during operation.

18 Claims, 10 Drawing Figures

ROLL CALL CALL-UP (NCS ONLY)

| PREAMBLE | PHASE REFERENCE | ADDRESS |
|---|---|---|
| 5 | 1 | 2 |

PICKET REPLY

| PREAMBLE | PHASE REFERENCE | START CODE | ... | PICKET STOP CODE |
|---|---|---|---|---|
| 5 | 1 | 2 | DATA | 2 |

NCS REPORT AND CALL-UP

| PREAMBLE | PHASE REFERENCE | START CODE | ... | CONTROL STOP CODE | ADDRESS |
|---|---|---|---|---|---|
| 5 | 1 | 2 | DATA | 2 | 2 |

| Processing State \ Functions | Link Control | EDAC Encoding | Control Code Generation | Message Encoding | Header Generation | Signal Modulation | Signal Demodulation | Signal Presence | Frame Synchronization | Phase Reference | Message Decoding | Control Code Recognition | EDAC Decoding | NTDS Input/Output | Radio Set Input/Output | Man/Machine | Built-In Test | Executive | Loader |
|---|---|---|---|---|---|---|---|---|---|---|---|---|---|---|---|---|---|---|---|
| Idle | | | | | | | | | | | | | | | | X | | X | X |
| Listening | X | | | | | | X | X | | | | | | | X | X | X | X | |
| Header Reception | X | | | | | | X | X | X | X | | | | | X | X | X | X | |
| Data Reception | X | | | | | | X | | | | X | X | X | X | X | X | X | X | |
| Header Transmission | X | | | | X | X | X | | | X | | | | | X | X | X | X | |
| Data Transmission | X | X | X | X | | X | X | | | | X | | | X | X | X | X | X | |

FIG. 7

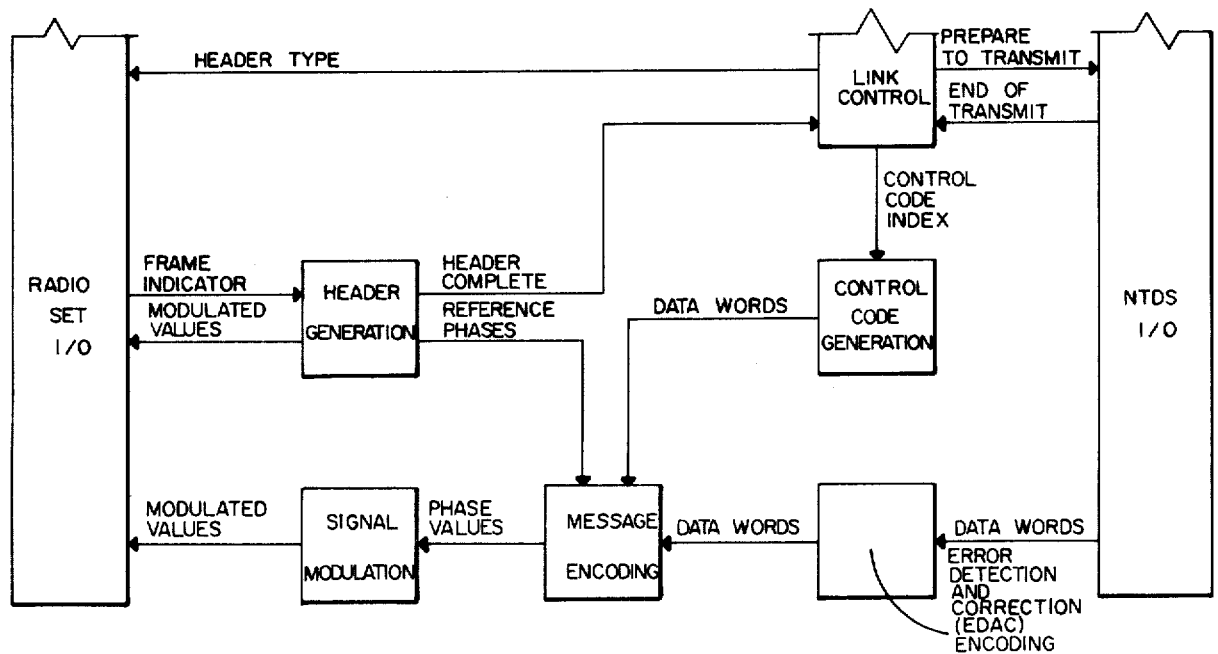

FIG. 8

| MODULE | RECEIVE | | | | | | | TRANSMIT | |
|---|---|---|---|---|---|---|---|---|---|
| | LISTENING | HEADER (SYNCHRONIZATION FRAMES 1,2,&3) | | | | | DATA | HEADER | DATA |
| | | SIGNAL PRESENCE | FS0 | FS1 | FS2 | PHASE REF. | | | |
| LINK CONTROL | 0.1-0.3 | 0.1-0.3 | 0.1-0.3 | 0.1-0.3 | 0.1-0.3 | 0.1-0.3 | 0.1-0.3 | 0.1-0.3 | 0.1-0.3 |
| EDAC ENCODING | N/A | N/A | N/A | N/A | N/A | N/A | N/A | N/A | 0.1 |
| CONTROL CODE GENERATION | N/A | N/A | N/A | N/A | N/A | N/A | N/A | N/A | 0.02 |
| MESSAGE ENCODING | N/A | N/A | N/A | N/A | N/A | N/A | N/A | N/A | 0.5 |
| HEADER GENERATION | N/A | N/A | N/A | N/A | N/A | N/A | N/A | 4.5/5.4 | N/A |
| SIGNAL MODULATION | N/A | N/A | N/A | N/A | N/A | N/A | N/A | N/A | 6.7 |
| SIGNAL DEMODULATION | 5.3 | 4.9-5.0 | 5.6-5.7 | 1.4-1.5 | 1.4-1.5 | 5.0 | 5.0 | 2.5 | 2.5 |
| SIGNAL PRESENCE | 0.2 | 0.6 | N/A | N/A | N/A | N/A | N/A | 0.1 | N/A |
| FRAME SYNCHRONIZATION | N/A | N/A | 0.2 | 3.1 | 4.9 | N/A | N/A | N/A | N/A |
| PHASE REFERENCE | N/A | N/A | N/A | N/A | N/A | 0.5 | N/A | 0.3 | N/A |
| MESSAGE DECODING | N/A | N/A | N/A | N/A | N/A | N/A | 1.85 | N/A | 0.7 |
| CONTROL CODE RECOGNITION | N/A | N/A | N/A | N/A | N/A | N/A | .45 | N/A | N/A |
| EDAC DECODING | N/A | N/A | N/A | N/A | N/A | N/A | 0.5 | N/A | N/A |
| NTDS INPUT/OUTPUT | N/A | N/A | N/A | N/A | N/A | N/A | 0.1-0.2 | N/A | 0.1-0.2 |
| RADIO SET INPUT/OUTPUT | 0.1-0.3 | 0.1-0.3 | 0.1-0.3 | 0.1-0.3 | 0.1-0.3 | 0.1-0.3 | 0.1-0.3 | 0.1-0.3 | 0.1-0.3 |
| MAN/MACHINE | 0.2-0.4 | N/A | N/A | N/A | N/A | N/A | 0.2-0.4 | N/A | 0.2-0.4 |
| BUILT-IN-TEST | 0 | N/A | N/A | N/A | N/A | N/A | N/A | N/A | N/A |
| LOADER | N/A | N/A | N/A | N/A | N/A | N/A | N/A | N/A | N/A |
| EXECUTIVE | 0.1-0.2 | 0.1-0.2 | 0.1-0.2 | 0.1-0.2 | 0.1-0.2 | 0.1-0.2 | 0.1-0.2 | 0.1-0.2 | 0.1-0.2 |
| TOTAL | 6.0-6.7 | 5.8-6.4 | 6.0-6.7 | 4.7-5.4 | 6.5-7.2 | 5.8-6.3 | 8.4-9.2 | 7.7-8.2 / 8.6-9.1 | 11.1-11.8 |
| MAXIMUM AVAILABLE: Fast/Slow Rate | 9 | 9 | 9 | 9 | 9 | 13.3 / 22 | 13.3 / 22 | 13.3 / 22 | 13.3 / 22 |

Time in msec

FIG. 11

PROGRAMMABLE DATA TERMINAL SET

BACKGROUND OF THE INVENTION

The present invention relates generally to the field of transmitting digital information over a computer-to-computer radio data link. More specifically, the present invention relates to the Navy Technical Data System (NTDS) and to the radio link (Link-11) permitting and controlling intercommunication between the various NTDS computers in the network.

The Link-11 data message consists of 48 binary digits. These bits are assembled in two frames, each of 24 bits. Six Hamming code parity check bits are added in each frame to make 30 bits for transmission. Each of the 15 pairs of bits in the frame are converted into a phase shift, with shifts of $-45°$, $-135°$, $-225°$ and $-315°$ representing bit-pairs (1,1), (0, 1), (0, 0) and (1,0). Differential coherent phase shift modulation is applied to each of fifteen audio tones. Fourteen tones are at frequencies of 935 Hz through 2,365 Hz at 110 Hz intervals, with a fifteenth tone at 2,915 Hz. The transmitted audio signal is the sum of the fifteen modulated signals and a Doppler tone. Phase transitions occur at frame boundaries, but within each frame the tones may be considered continuous wave (CW) signals. The Doppler tone is a CW 605 Hz tone which is used for Doppler frequency shift corrections. The transmitter uses the audio signal to amplitude modulate an HF radio frequency carrier and transmits a double sideband suppressed carrier HF signal. Each of the two sidebands, the upper sideband (USB) and the lower sideband (LSB), contains the same audio signal on transmission, but anomalies in the propagation path, noise, and interference may cause the received sidebands to differ.

Each transmission, except in the network synchronization mode, begins with a preamble consisting of five frames followed by a phase reference frame. Only the 605 Hz Doppler correction tone and the 2,915 Hz framing tone are transmitted during the five preamble frames. The 2,915 Hz tone is given twice its normal amplitude and is phase shifted 180° at each frame boundary to provide for frame synchronization. The 605 Hz tone is given twice the amplitude of the 2,915 Hz tone during the preamble frames and twice the amplitude of the information carrying tones for all other transmitted frames. The preamble is followed by a reference frame during which all data tones are transmitted to establish a reference phase for each.

The data rate is selected by the operator. It may be either a fast rate of 2,250 bps with a data frame interval of approximately 13.3 msec, or it may be a slow rate of 1,364 bps with a data frame interval of approximately 22 msec.

There are five modes of operation in a Link-11 net: Roll Call, Net Sync, Net Test, Broadcast, and Short Broadcast. This portion of the system operation is called Link Control.

Roll Call is the normal mode of operation. One unit is designated as the Net Control Station (NCS) and all other units are called Picket Stations. The net cycle is started at the NCS which calls the first Picket Station address. The NCS receives the data transmitted by the called Picket Station and calls each Picket Station in turn. When the last station in the net has been called, the NCS transmits its own data followed by a Picket address and the cycle repeats. The Picket Stations receive every transmission but transmit their own data only after recognizing their own station address. Each transmission sent by a participating unit is preceded by a message header as shown in FIG. 1, the numbers indicating the number of frames.

Normally the NCS transmits Net Sync prior to Roll Call operation. During Net Sync the NCS transmits a continuous sequence of preamble frames to permit Picket Stations to synchronize with the NCS. In the Net Test mode, the NCS transmits a predetermined data sequence which is received by the Picket Station data terminals and compared against the same internally generated sequence.

In Broadcast mode a station (either NCS or Picket) transmits until the data terminal is manually reset. In Short Broadcast mode a station (either NCS or Picket) initiates a single transmission sequence and the data terminal is reset at the end of that sequence.

The information is carried by each tone in the form of phase shifts from the same tone in the previous frame. Each tone represents two data bits. The remainder of the Link-11 functions will be described in conjunction with the description of the present invention.

The above functions have traditionally been implemented in special purpose hardwired equipment. The hardware currently in use is expensive, at least six times more costly than the programmable data terminal set (PDTS) of the present invention. The hardwired equipment is unique and difficult to maintain. Installation of the equipment is expensive due to its large size and the requirement for chilled water cooling. Changes to equipment are difficult to implement and costly.

SUMMARY OF THE INVENTION

Prior to the present invention, it was generally believed that a general purpose digital computer could not be programmed to operate at a rate compatible with a computer data output to control the modulation, demodulation, sequencing and control in a computer to computer radio data link. The present invention relates to the use of a general purpose digital computer combined with a hardwired interface means so as to provide a data terminal set for a computer-to-computer radio data link that is both very economical to construct and that can also be reprogrammed to implement changes in data link parameters. The PDTS is smaller and lighter than current shipboard equipment. Maintenance is improved because a general purpose piece of equipment replaces a prior art uniquely hardwired device. There is no requirement for chilled water cooling since the equipment is air cooled.

The processor program may be divided into five groups of functions: Transmit, Receive, Input/Output, Control and Auxiliary. Function names are generally shown in parenthesis in this section.

During transmission, information received from the NTDS or other computer data source is augmented with redundancy bits (EDAC Encoding), differential phase encoded (Message Encoding) and modulated onto sixteen audio tones (Signal Modulation). Five preamble frames consisting of two audio tones, a phase reference frame (sixteen audio tones) and start code frames are generated (Header Generation). Control codes are also generated (Control Code Generation).

In the receive mode, data from the Radio Set Interface unit corresponding to two sidebands are converted to complex values for each tone frequency (Signal Demodulation). The Signal Demodulation function also applies a correction for Doppler frequency. During the first portion of the preamble, the presence of a signal is detected and a coarse estimate made of the Doppler frequency (Signal Presence). During the last portion of the preamble, the frame boundary is determined and a more precise Doppler correction obtained (Frame Synchronization). During the first frame after the preamble, the presence of multiple data tones is detected (Phase Reference) and an indication sent to the Link Control function. This initiates the message reception. The difference between the phase for each tone in the current frame is determined and converted to a bit-pair (Message Decoding). Prior to the phase difference determination a coherent diversity signal is formed and the Message Decoding operation applied to two sidebands and the diversity signal. Following Message Decoding each data word is inspected to determine if it is apparently error free, contains a correctable error, or contains uncorrectable errors (EDAC Decoding). This information and the data word is forwarded to the NTDS or other appropriate computer. The presence of control codes is checked by the Control Code Recognition function.

There are two input/output functions. The Radio Set Input/Output function controls the flow of data between the Radio Set Interface unit and the transmit and receive group of functions. The NTDS Input/Output function controls the flow of data between the NTDS computer and the Data Terminal Set.

Control is performed by the Link Control function which maintains a record of Link status and controls switching between receive and transmit modes.

There are four auxiliary functions. The Man/Machine function provides the logical interface between the system operator and the digital processor program. The Executive function provides a variety of overhead functions such as processing of internal and external interrupts, maintaining clocks and coordinating various processes. The Built-In Test function monitors all interfaces between the Data Terminal Set computer and associated equipment and provides on-line failure detection for the system. The Loader function is used to automatically load the PDTS program.

During transmission, the radio set interface takes parallel digital values from the general purpose digital computer of the PDTS, performs a D/A conversion and uses a low-pass filter to produce an audio tone package which it sends to the radio transmitter. During reception, the radio set interface takes two independent audio signals, one for each sideband, from the radio receiver. Balanced in-phase and quadrature-phase signals are formed from each of the two input audio signals. Resulting audio signals are A/D converted and each sample value is presented to the computer as a parallel digital number.

It is noted that although the specific embodiments and best mode of the present invention are described herein in terms of the specific constraints and requirements of Link-11, it is to be understood that the present invention is equally suitable for any computer-to-computer radio data link.

STATEMENT OF THE OBJECTS OF THE INVENTION

Accordingly, it is the primary object of the present invention to disclose a technique and apparatus for using a general purpose digital computer to perform the modulation and demodulation of the radio signals in a computer-to-computer radio data link as well as the control of the data link operation, sequencing and testing.

It is a further object of the present invention to disclose a novel sequence of computer programs operable at speeds sufficiently fast to control the modulation and demodulation as well as sequencing and control functions in a computer-to-computer radio data link.

It is a still further object of the present invention to disclose a unique combination of a programmed general purpose digital computer and interface means to serve the purpose of prior art hardwired devices at a substantial cost savings.

It is yet another object of the present invention to disclose a novel set of algorithms and computer programs based thereon permitting a general purpose digital computer to achieve programming speeds previously believed to be unattainable and necessary to perform the modulation, demodulation, control and sequencing in a computer-to-computer radio data link.

It is a further object of the present invention to disclose a system permitting self-test and signal quality monitoring in a computer-to-computer radio data link.

Other objects, advantages and novel features of the invention will become apparent from the following detailed description of the invention when considered in conjunction with the accompanying drawings.

BRIEF DESCRIPTION OF THE DRAWINGS

FIG. 7 is a chart illustrating the correlation between processing states and functions.

FIG. 8 is an illustration of the transmit subsystem signal flow.

FIG. 11 is a table illustrating the processing times attainable with the present invention.

DESCRIPTION OF THE PREFERRED EMBODIMENT

Figures 1, 2:
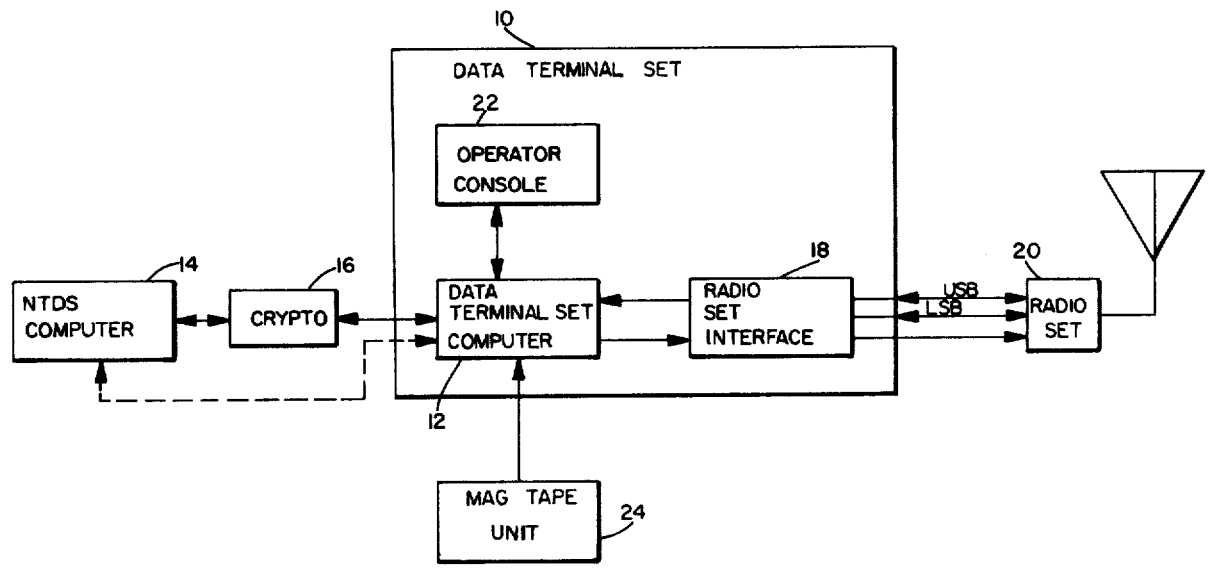
FIG. 1 is an illustration of the call-up and report formats.
FIG. 2 is a block diagram of the system configuration of the present invention.

FIG. 2 shows the major components of the system and interfacing hardware. The Programmable Data Terminal Set 10 performs the modulation, demodulation and control functions required for Link-11 or other radio link communications. The digital processor program operates within the general purpose digital computer 12 which may comprise, for example, an AN/UYK-20 computer to perform all of the software functions of the Data Terminal Set. The Data Terminal Set computer 12 accepts 24-bit parallel data, for example, from the NTDS or other data system computer 14, either directly or through a cryptographic device 16 as is illustrated in the drawing. The data is digital-to-analogue converted in the Radio Set Interface unit 18 and used to modulate the transmitter in the radio set 20. Similarly, data received from the receiver in the radio set 20, is analogue-to-digital converted in the Radio Set Interface 18, passed to the computer 12 where it is demodulated and converted to parallel binary words, and forwarded to the computer 14. The operator control console 22 is used to initialize the system, modify link parameters and monitor the Data Terminal Set performance. A magnetic tape unit 24 such as a Univac 1240 is used to load the program.

The operator console 22 provides operator control and status indications and may comprise, for example, an alphanumeric display device including a display screen which is a cathode ray tube used for presenting the individually drawn alphanumeric characters and also includes a keyboard providing all of the controls and keys required to operate the terminal. A suitable console is described in Sperry Univac Equipment Specification SB11050. The alphanumeric display device operator console 22 interfaces with the digital processor program via the Man/Machine function. The Man/Machine function performs only logical operations on systems status parameters so that the console imposes no computational accuracy requirements on the program. No critical timing requirements are imposed on the program by the operator console.

The program consists of the functions listed in Table I below. These functions may be divided into five groups as indicated. The transmit and receive groups are further divided into three sub-groups.

Table I

PROGRAM FUNCTION IDENTIFICATION

| GROUP | | FUNCTION |
|---|---|---|
| Transmit | | |
| | Message Generation | EDAC Encoding (EE) |
| | | Control Code Generation (CG) |
| | | Message Encoding (ME) |
| | Header Generation | Header Generation (HG) |
| | Modulation | Signal Modulation (SM) |
| Receive | | |
| | Demodulation | Signal Demodulation (SD) |
| | Header Processing | Signal Presence (SP) |
| | | Frame Synchronization (FS) |
| | | Phase Reference (PR) |
| | Message Processing | Message Decoding (MD) |
| | | Control Code Recognition (CR) |
| | | EDAC Decoding (ED) |
| Input/ | | Radio Set Input/Output (RS) |
| Output | | NTDS Input/Output (NT) |
| Control | | Link Control (LC) |
| Auxiliary | | Man/Machine (MM) |
| | | Bulit-In Test (BT) |
| | | Executive (EX) |
| | | Loader (LD) |

The PDTS system 10 operates in six distinct processing states: idle, listening, header reception, data reception, header transmission, and data transmission. The PDTS 10 is in the idle state after program loading and prior to program initialization. The PDTS is in the listening state while neither transmitting nor having yet received the first preamble frame of a message. The PDTS 10 is in the header reception state from detection of signal presence in the first preamble frame through detection of the phase reference frame. The PDTS 10 is in the data reception state following detection of the phase reference frame until detection of the end of the message. The PDTS is in the data transmission state while transmitting the remainder of the message. A cross-correlation table showing the functions affected by each of the states is shown in FIG. 7.

A basic signal flow diagram of the transmit, input/output, and control functions is illustrated in FIG. 8. A basic signal flow diagram of the receive subsystem showing the relationship between receive, input/output, and control functions is presented in FIG. 9. A basic signal flow diagram of the auxiliary functions is presented in FIG. 10. It is noted that the blocks indicate computer program functions and the information on the lines interconnecting the blocks indicate the information type.

The following functions are implemented in the general purpose digital computer 12 to provide an enlarged signal processing repertoire for programming.

Fast Fourier Transform (FFT)

This routine computes the Fast Fourier Transform of an array of N complex points contained in a contiguous block of core, in natural order, and stores F(k) in the same block in bit reversed order. For the present example, the FFT algorithm requires that N=32, i.e., the array may consist of thirty-two complex points. The stored values, F(k), are rounded. The input data must be scaled prior to executing the FFT; 12-bit accuracy is maintained. The FFT is defined as:

$$F(j) = \frac{1}{2^s} \sum_{K=0}^{N-1} T(k) e^{-i2\pi jk/N}$$

$$j = 0, 1, \ldots, N-1$$

where, $F(j)$ = the complex $j^{th}$ coefficient of the FFT of the input array s = scale factor $T(k) = k^{th}$ complex number of the input array $i = \sqrt{-1}$ The input for this function is the input array starting address. It is noted that the input array for all major mocrocode functions described herein consists of complex numbers stored in two adjacent memory cells; for each real component located as address x, its imaginary component will be located at address x+1. Example: N=32

| Address$_{10}$ | Contents | |
|---|---|---|
| 1000 | Real$_1$ | First Complex Number |
| 1001 | Imaginary$_1$ | |
| ... | ... | |
| 1062 | Real$_{32}$ | $32^{nd}$ Complex Number |
| 1063 | Imaginary$_{32}$ | |

The computation of the FFT or the inverse FFT results in scrambling the data addresses. The correct address for coefficient k is formed by reversing the bit order of the coefficient number expressed in binary. Examples of bit reversals for a 32-point FFT are:

| Scrambled output of FFT | Unscrambled Final Address |
|---|---|
| 00 000$_2$ | 00 000$_2$ |
| 00 001$_2$ | 10 000$_2$ |
| 00 100$_2$ | 00 100$_2$ |
| 11 111$_2$ | 11 111$_2$ |

This function unscrambles the contents of the addresses of the input array. No scaling is performed by the instruction. The inputs for this function are the input array starting address and n.

Inverse Fast Fourier Transform (IFFT)

This function computes the inverse FFT of an array of N complex points contained in a contiguous block of core, in natural order, and stores T(k) in the same block bit reversed order. The IFFT algorithm requires for the present example that N=64. The stored values, T(k), are rounded. The input data must be scaled prior to executing the FFT; 12-bit accuracy is maintained. The IFFT is defined as:

$$T(k) = \frac{1}{2^s} \sum_{j=0}^{N-1} F(j) e^{j2\pi jk/N}$$

$$K = 0, 1, \ldots, N-1$$

where,

T(k) = the complex $K^{th}$ coefficient of the IFFT of the input array s=scale factor
F(j) = $j^{th}$ complex number of the input array
i = $\sqrt{-1}$ The inputs for this function are the input array starting address.

Amplutide and Phase (Modulo $2\pi$)

This function converts a complex spectrum of N points into an array of N real amplitudes, A, and phase angles, $\phi$. The following equations define A and $\phi$:

$$A = \sqrt{R^2 + I^2}$$
$$\phi = \tan^{-1} I/R - \frac{(1 - sgn(I))}{2} \pi, 0 \leq$$
$$\tan^{-1} I/R < \pi, -\pi < \phi < \pi$$

where,
R = real component
I = imaginary component
N = $2^n (5 \leq n \leq 6)$

The inputs are the input array starting address, n, and output array starting address. For the output format, A and $\phi$ are stored in alternate locations beginning with $A_1$ at the output array starting address (the output array may have the same addresses as the input array).

Separate

This function separates the results of two real input sequences transformed as a single complex FFT. The input data consists of an array of N complex numbers, designated F(j) (where j=0, 1, . . . , N-1), stored in contiguous memory locations. F(j) is reordered to produce the output arrays of numbers $F_1(j)$ and $F_2(j)$, in a single complex transform (j=0, 1, . . . , (N/2)−1). $F_1(j)$ is stored in natural order in the memory addresses which previously contained the first half of the input array, and $F_2(j)$ is similarly stored in the remaining memory addresses. The separate instruction is defined as:

$$F_1(j) = \frac{1}{2}(F^*(N-j) + F(j)) \text{ stored in place of } F(j)$$

$$F_2(j) = i/2 (F^*(N-J) - F(j)) \text{ stored in place of } F(N/2+j)$$

where,
F(N) ≡ F(O)

j = 0, 1, . . . , (N/2) − 1
F* = complex conjugate of F
i = $\sqrt{-1}$

The trigonometric and square root functions are also implemented in the microcode.

Figure 3:
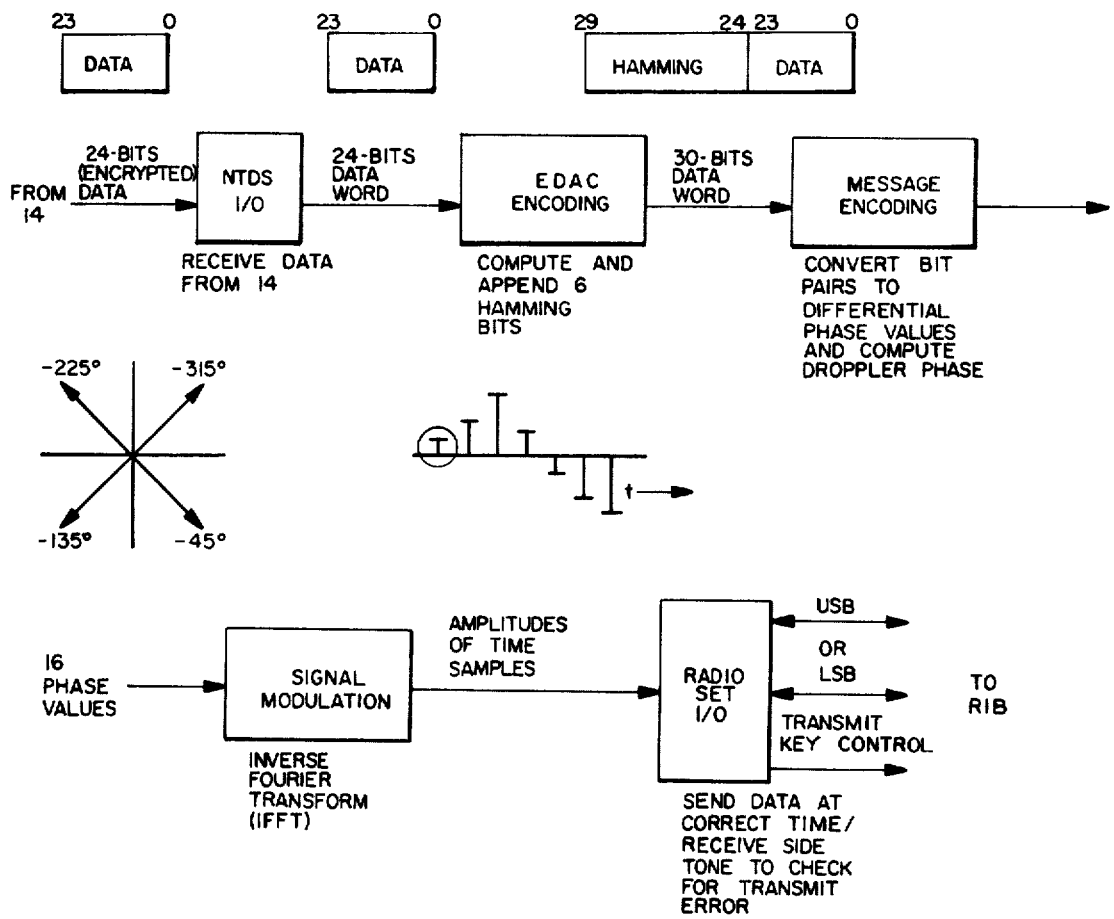
FIG. 3 is a block diagram of the software transmission processing of the present invention.

Referring now to FIG. 3, the transmission processing in the PDTS computer 12 will be described. Each block of FIG. 3 is a software program. The 24-bits of data from the data source computer 14 is received by the input/output program and passed to the error detection and correction (EDAC) encoding program which computes and appends six Hamming code bits. Next the message encoding program converts the 15-bit pairs to differential phase values and computes a Doppler tone phase. The phase values are then converted to a composite digitized audio tone package (sixteen tones) samples at a 7040 Hz rate by the signal modulation program using an Inverse Fast Fourier Transform (IFFT). Finally, the amplitudes of the signal are forwarded to the RIB unit 18 by the radio set I/O program which also controls the transmitter key signal.

Figure 4:
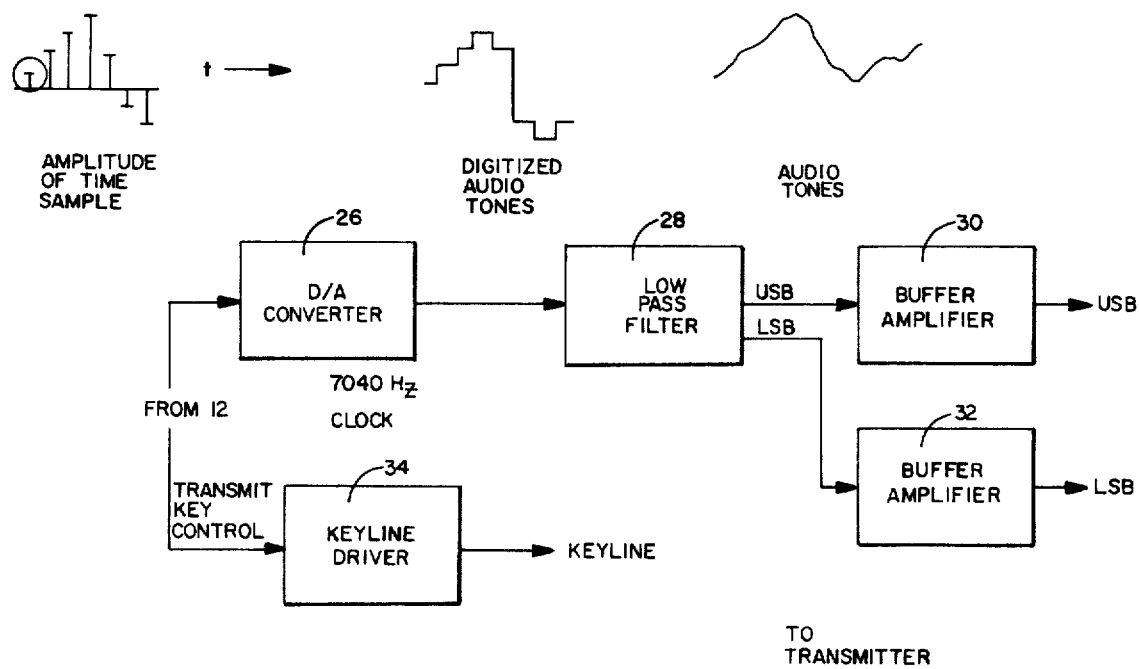
FIG. 4 is a block diagram of the transmission portion of the radio interface unit of the present invention.

Referring now to FIG. 4, the RIB radio set interface 18 transmission processing is illustrated. As seen therein, the RIB interface 18 transmission section is seen to be comprised of a D/A converter 26 which receives its input from computer 12 and is driven by a suitable clock such as a 7040 Hz clock. A low pass filter 28 is connected to the output of the D/A converter 26. A first buffer amplifier 30 and a second buffer amplifier 32 are connected to the outputs of the low pass filter 28. Key line signals are forwarded to the radio set 20 by the key line driver 34 to initiate and terminate transmission and reception.

During transmission, the radio set interface 18 hardware takes 16-bit (only to 12-bit precision) signed digital values from the terminal processor 12 at an accurate 7040 per second rate. The least significant 12-bits of each signed value are digital-to-analogue converted by the D/A converter 26 and the result is passed through low pass filter 28 to produce an audio signal in the 3KHz band. A signal is put on a key line to turn the radio transmitter on so that the transmitter will have reached 90 percent, for example, of its rated power output when the first audio signal is sent. The low pass filter 28 output is buffered to the upper and/or lower sideband input to the transmitter of the radio set 20.

Figure 5:
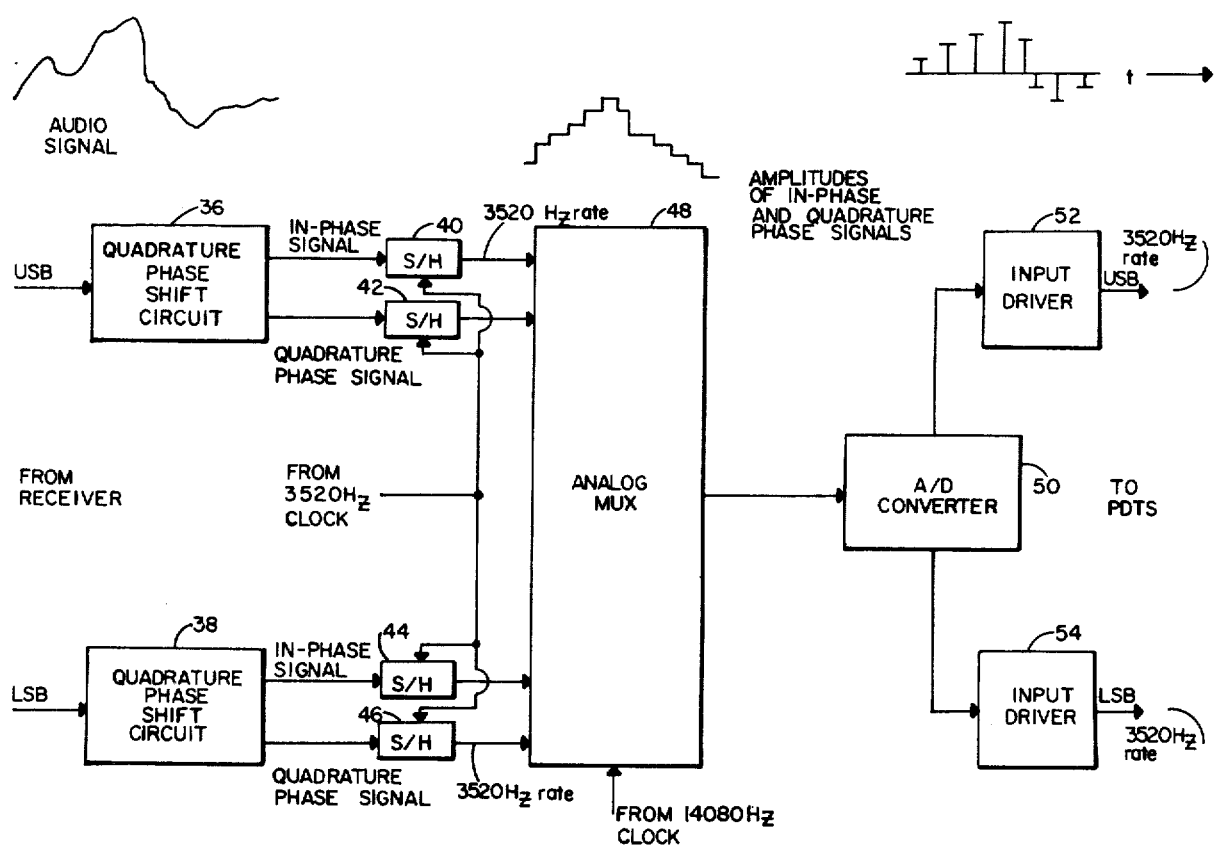
FIG. 5 is a block diagram of the reception portion of the radio interface unit of the present invention.

The received signal processing begins at the RIB interface 18 which takes two separate audio signals from the radio set 20 in the receive mode of operation. The reception portion of the interface 18 is illustrated in FIG. 5. Each of the upper and lower sideband signals is converted into component signals, an in-phase signal and a quadrature-phase signal by the quadrature phase shift circuits 36 and 38. Every audio tone in the quadrature-phase signal will lag the corresponding tone in the in-phase signal by 90°. The outputs of the quadrature-phase shift circuits 36 and 38 are connected to sample and hold networks 40, 42, 44 and 46 and pass through analogue multiplexer 48 to the A/D converter 50. The sample and hold circuits 40, 42, 44 and 46 are driven from a 3520 Hz clock, for example, preferably derived from the same clock source as that to the D/A converter 26 in FIG. 4 and permits sampling of the same signal at the same time. Analogue multiplexer 48 is provided to permit use of the same A/D converter 50 for each input. A/D converter 50 provides an upper sideband output through input driver 52 and a lower sideband output through input driver 54.

By the receive interface arrangement illustrated in FIG. 5, the relative phases and amplitudes of each tone are preserved. Each of the four resulting audio signals, in-phase and quadrature-phase from each received signal is analogue-to-digital converted by the A/D converter 50 into signed digital values with 12-bits of precision. The sampling is at a 3520 per second rate, precisely controlled by the same frequency standards used for transmission. Each signed digital value is formed into a 16-bit word by sign filling (the data is left justified) and the digital values are transferred to the terminal processor 12.

Figure 6:
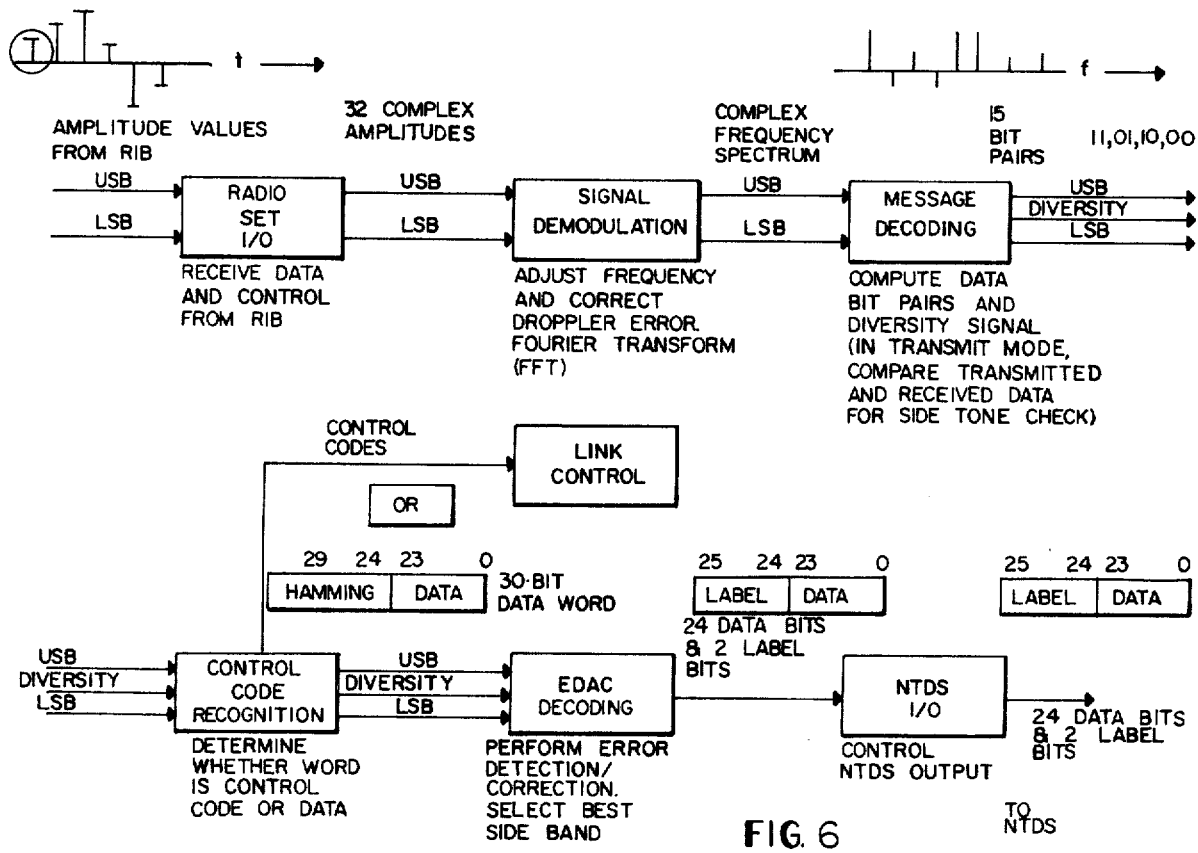
FIG. 6 is a block diagram of the PDTS reception software processing according to the present invention.

The processing of the received data in the PDTS computer 12 begins with receiving the upper and/or lower sideband signals by the radio set I/O program (FIG. 6). The information is then passed to the signal demodulation program which adjusts the frequencies of the incoming data and corrects the Doppler error. The data is demodulated using a Fast Fourier Transform (FFT). The message decoding program converts the spectral components into 15-bit pairs. A diversity signal is formed by combining the upper and lower sideband signals. The data is next checked to determine whether it is a control code or not by the control code recognition program. If the data is a control code, it is forwarded to the Link Control program. Otherwise, the EDAC decoding program performs error detection and correction and selects the sideband data with the least errors. The selected data is forwarded to the NTDS or other computer by the NTDS I/O program.

Figure 9:
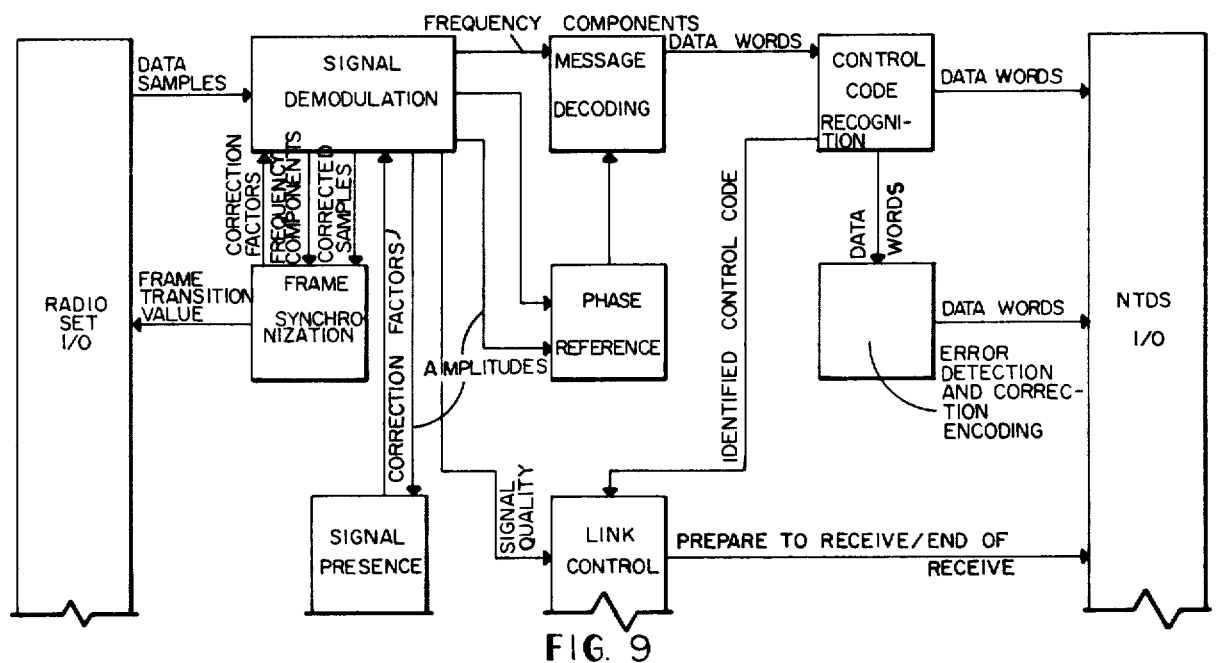
FIG. 9 is an illustration of the receive subsystem signal flow.
Figure 10:
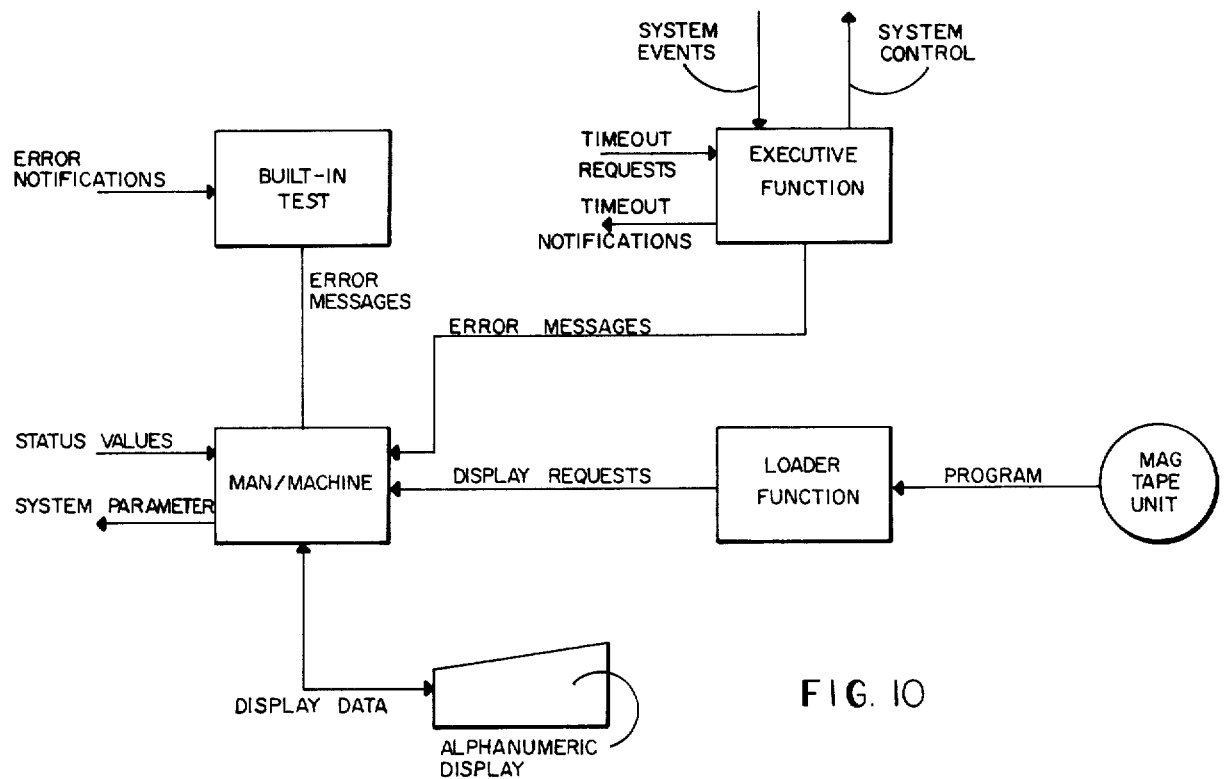
FIG. 10 is an illustration of the auxiliary subsystem signal flow.

The detailed functional requirements of the program functions that comprise the PDTS computer 12 will now be described with reference to FIGS. 8, 9 and 10 illustrating respectively the transmit subsystem signal flow, the receive subsystem signal flow and the auxiliary subsystem flow. It is noted that the blocks in FIGS. 8, 9 and 10 denote program functions and the information on the lines interconnecting the blocks indicate signal type.

The data terminal is always in one of three states: idle, receive, or transmit. The data terminal is in the idle state when the program has been loaded (Loader mode) or the selected program (On-Line or Maintenance mode) has not been initialized and started. The data terminal is in the receive state when either listening for a preamble, receiving a header, or receiving data. The data terminal is in the transmit state when transmitting either header or data. The value of this state is available to all functions.

The Receive Processing Index (RPI) is a subdivision of the receive state and is available to all functions. It has the following values:
0 = listening, no signal presence
1 = signal presence detected
2 = frame synchronization accomplished
3 = phase reference frame detected
4 = start code accepted
5 = stop code accepted The configuration parameters and address values maintained by the Man/Machine function are also available to all other functions.

Link Control

The requirements of this program have been described in the Background of the Invention above.

In the idle state, the input that this function responds to is an initiate request from the Executive function to begin operations.

In the receive state, the input to this function is one of the following:
a. A signal quality value from the Signal Demodulation function indicating the measured signal quality of the frame just demodulated.
b. A XMT INITIATE/RESET from the Man/Machine functions as the result of the operator depressing the designated key on the ADD console 22.
c. An accepted/no control code value from the Control Code Recognition function indicating that a start, control stop, picket stop, ownship address, or no control codes were detected.
d. A timeout notification from the Executive function indicating that a Picket Station has not replied.
e. A terminate request from the Built-In Test or Executive function to cease operations.

In the transmit state, the input to this function is one of the following:
a. A XMT INITIATE/RESET from the Man/Machine function as the result of the operator depressing the designated key on the ADD console 22.
b. A header complete notification from the Radio Set Input/Output function indicating that the last header frame has been generated.
c. A data available indicator, having the value true or false, from the NTDS Input/Output function.
d. A terminate request from the Built-In Test or Executive function to cease operations.

This function provides the logical interface between the receive and transmit functions to maintain the discipline required by a Net Control or Picket Station in a Link-11 net.

The processing performed by this function is in response to the particular input received and the data terminal state.

(1) In the idle state:
When an initiate request is received, an initiate request is sent to the Radio Set Input/Output function to begin input from the Radio Set Interface, the Receive Processing Index is set to zero (listening), and the data terminal is placed in the receive state.

(2) In the receive state:
When a signal quality value is received it is added to a sum of previous values. If 750 values have now been received, the average is computed and sent to the Man/Machine function for the SIG QUAL status display to the operator, and the summing process is started again. If this input represents the fourth consecutive bad signal quality value, a missed stop code is assumed and the processing for a picket stop code is performed. The NCS in Roll Call mode will call the next address and a Picket Station or the NCS in other than Roll Call mode will return to listening.

When a XMT INITIATE is received and the data terminal is in the Broadcast or Short Broadcast mode, a Prepare to Transmit-Broadcast request is sent to the NTDS Input/Output function and a header type value of three (data header) is sent to the Radio SEt Input/Output function.

When the data terminal is in the Roll Call mode at the NCS, a header type value of two (address header) is sent to the Radio Set Input/Output function. When the data terminal is in the Net Test mode at the NCS, a header type value of three is sent to the Radio Set Input/Output function. When the data terminal is in the Net Sync mode at the NCS, a header type value of one (continuous preamble frames) is sent to the Radio Set Input/Output function. In these cases the Receive Processing Index is set to zero (listening) and the data terminal is placed in the transmit state. In all other cases an illegal action message is sent to the Built-In Test function in response to a XMT INITIATE function key.

When an identified control code value is received the processing criteria is based on the particular control code detected or the absence of a control code where one should be found.

When a start code is detected and the RPI has the value three (phase reference received last), the RPI is set to four (start code detected) and a Prepare to Receive request is sent to the NTDS Input/Output function to notify the NTDS computer that data is to follow. If the RPI does not have the value three this input results in an error notification to the Built-In Test function.

When a control stop code is detected and the RPI has the vcalue four, an End of Receive request is sent to the NTDS Input/Output function to notify the NTDS computer of the end of data for this transmission. At a Picket Station the RPI is then set to five to indicate that a control stop has been detected and an address code is expected in the next two frames. At the NCS this input indicates that another station is also acting as a NCS and an error notification is sent to the Built-In Test function.

When a picket stop code is detected and the RPI has the value four an End of Receive request is sent to the NTDS Input/Output function. At the NCS, an "accepted call" display for the current picket address is sent to the Man/Machine function to clear a previous "missed call" display for that address. At a Picket Station or the NCS in other than Roll Call mode, the RPI is set to zero to reinitialize the receive state and no further processing is performed. At the NCS in Roll Call mode, the next picket address in the list of addresses, treated circularly, is considered. If the last picket was the last address of the list then data is to be transmitted. In this case a header type value of three is sent to the Radio Set Input/Output function, a Prepare to Transmit-Roll Call request is sent to the NTDS Input/Output function, the RPI set to zero, and the data terminal placed in the transmit state. If the last picket called was not the last address of the list then no data is to be transmitted prior to the picket address. In this case a header type value of two (address header) is sent to the Radio Set Input/Output function, the RPI is set to zero, and the data terminal placed in the transmit state.

When an ownship address code is detected at a Picket Station in Roll Call mode, then it is this station's turn to transmit. In this case a header type value of three is sent to the Radio Set Input/Output function, a Prepare to Transmit-Roll Call request is sent to the NTDS Input/Output function, the RPI is set to zero, and the data terminal is placed in the transmit state. At a Picket Station not in Roll Call mode this input is ignored.

The value of ON for the RCV MODE status indicator is sent to the Man/Machine function for display to the operator when a start code is received. The value OFF is sent when a stop code is either received or assumed.

At the NCS, the value OFF for the NET BUSY status indicator is sent to the Man/Machine function when a start code is received or a timeout notification is received for a Picket call. At a Picket Station, the value ON is sent when a start code or address code (ownship or other) is received and the value OFF is sent when a stop code (control or picket) is received.

When the NCS receives a timeout notification it is interpreted to mean that a Picket Station has failed to respond to its address call. If this is the first failure during a cycle, another address call is made. In this case a header type value of two is sent to the Radio Set Input/Output function, the RPI is set to zero, and the data terminal is placed in the transmit state. If this is the second failure to respond, a "missed call" display for that station is sent to the Man/Machine function and the next picket address in the address list is considered as described above for an identified picket stop code.

When a terminal request is received, a terminate request is sent to the Radio Set Input/Output function to stop all input/output operations of the RSI, an End of Receive request is sent to the NTDS Input/Output function if data was being transmitted to the NTDS computer, and the data terminal is placed in the idle state.

(3) In the transmit state:

When a XMT INITIATE is received an illegal action message is sent to the Man/Machine function.

When a XMT RESET is received, a Reset request is sent to the NTDS Input/Output function, an XMT disable request is sent to the Radio Set Input/Output function, the RPI set to zero, and the data terminal is placed in the receive state.

When a header complete notification is received at a Picket Station or at the NCS in the Roll Call mode when sending its own data or a the NCS in Broadcast or Short Broadcast mode and the data available input received previously has the value true, a next word request is sent to the NTDS Input/Output function to ccept the next data word. If the value is false then the NTDS computer has failed to respond to a request for data. An error notification of this condition is sent to the Built-In Test function if this is the second consecutive time, and the processing for an end of transmission condition, as described below, is performed. At the NCS in Roll Call mode, when not sending its own data, a control code index for the next picket address is sent to the Control Code Generation function, the net busy counter is started by sending a timeout request to the Executive function, the RPI is set to zero, and the data terminal is placed in the receive state. At the NCS in Net Test mode, a control code index for the next permuted data word is sent to the Control Code Generation function.

When a data available indicator is received and has the value true, a next word request is sent to the NTDS Input/Output function if the header complete notification has previously been received. When the data available indicator has the value false, an end of transmission condition is recognized. At a Picket Station a control code index for the picket stop code is sent to the Control Code Generation function, the RPI is set to zero, and the data terminal is placed in the receive state. At the NCS a control code index for the control stop code is sent to the Control Code Generation function if one has not already been sent. If one has been sent, a control code index for the next picket address is sent, the net busy counter is started, the RPI set to zero, and the data terminal is placed in the receive state.

When a terminate request is received the processing performed is identical to that described for the receive state.

The value of ON for the XMT MODE status indicator is sent to the Man/Machine function when a header type value of three is sent to the Radio Set Input/Output function. The value OFF is sent when a picket stop code is generated at a Picket Station, or an address code is generated at the NCS.

At a Picket Station, the value On for the NET BUSY status indicator is sent to the Man/Machine function when a start code is generated and the value OFF is sent when a picket stop code is generated. At the NCS, the value ON is sent when a start code (own data transmission) or an address code (picket call) is generated.

In the idle state, the output of this function is an initiate request to the Radio Set Input/Output function.

In the receive state, the output of this function is one of the following:

a. A status value and item indicator to the Man/Machine function.
b. A prepare to Transmit-Roll Call, a Prepare to Transmit-Broadcast, a Prepare to Receive, an End of Receive, or a Reset request to the NTDS Input/Output function.
c. A header type value to the Radio Set Input/Output function.
d. A control code index and frame indicator to the Control Code Generation function.
e. A terminate request to the Radio Set Input/Output function.
f. An error notification to the Built-In Test function.
g. An accepted address to the Man/Machine function.
h. A missed address to the Man/Machine function.

In the transmit state, the output of this function is one of the following:

a. A status value and item indicator to the Man/Machine function.
b. A Prepare to Transmit-Broadcast or a Reset request to the NTDS Input/Output function.
c. A header type value to the Radio Set Input/Output function.
d. A XMT disable request to the Radio Set Input/Output function.
e. A control code index and frame indicator to the Control Code Generation function.
f. A next word request to the NTDS Input/Output function.
g. A terminate request to the Radio Set Input/Output function.
h. An error notification to the Built-In Test function.
i. A timeout request to the Executive function.

To provide an off-line maintenance capability to isolate faulty software or hardware components, this function also supports the following additional requirements:

a. Inhibit the keying on of the transmitter.
b. Inhibit the sending of received data to the NTDS computer.
c. Inhibit the receiving of data from the NTDS computer.
d. Use special octal data patterns: 52525 25252, 25252 52525, 00000 00000, and 77777 77777.
e. Enable sustained instruction testing by the Built-In Test function (Test 1).
f. Enable the circulation of test data patterns through the computer 12 without using the Radio Set Interface (Test 2). This requires that the real data normally presented to the RSI be checked for correctness and the equivalent complex data, that would have been received for the real data, be input to the receive processing functions.
g. Enable the circulation of test data patterns through the computer 12 and the Radio Set Interface (Test 3).
h. Interpret a XMT INITATE as a signal to start the selected test.
i. Interpret a XMT RESET as a signal to stop the selected test.
j. Report the success or failure of each of the tests to the operator with the count of frames successfully circulated.

EDAC Encoding

Each 24-bits of information received from the NTDS computer is augmented by six Hamming code redundancy bits to produce a 30-bit data word for transmission. The use of redundancy bits permits validation and limited correction of received data words.

The only input to this function is twenty-four information bits from the NTDS Input/Output function every 13.3 ms. (Fast) or 22 ms. (Slow) while data is being transmitted.

This function augments the 24-bit data word received from the NTDS computer with six Hamming code redundancy bits to generate a 30-bit transmission word.

Data bits 0 through 23 are those received from the NTDS computer and data bits 24 through 29 are intially set to zero. Five bit patterns are used for encoding as well as for the decoding. Below are the patterns used:

| Pattern | Bits Set to One |
|---------|-----------------|
| 1 | 0,1,3,4,6,8,10,11,13,15,17,19,21,23, & 25 |
| 2 | 0,2,3,5,6,9,10,12,13,16,17,20,21, & 26 |
| 3 | 1,2,3,7,8,9,10,14,15,16,17,22,23, & 27 |
| 4 | 4 through 10, 18 through 23, 28 |
| 5 | 11 through 23, & 29 |

Data bits 0 through 29 are logically ANDed with each of the bit patterns to generate five partial words. The parity of each partial word is indicated as a one for even parity or a zero for odd parity and inserted into the data word in the bit position corresponding to the last bit in the pattern. The overall parity of the entire data word is now indicated as a one for even parity or a zero for odd parity and inserted into bit position 24. This completes the encoding process.

The output of this function is a 30-bit data word generated at the same rate as the input and is routed to the Message Encoding and Message Decoding functions.

Control Code Generation

During the transmit cycle a control stop, picket stop, or address code sequence is appended to the data stream. Although all control and address codes are comprised of 60 bits, only 30 bits at one time are generated by this function.

The required inputs to this function, generated upon demand, are:

a. A control code index representing the desired control code from the Link Control function. The sixty-five legal values of this index are from 0 to $100_8$.
b. A frame indicator denoting which 30-bit frame of the control code is desired from the Link Control function.

This function locates and outputs the appropriate 30-bits to be modulated.

All of the control codes used by the PDTS are contained in a stored table of 65 entries, with each entry 60 bits long. Entry 0 corresponds to the control stop code and entry $77_8$ corresponds to the picket stop code. Entries 1 through $76_8$ correspond to the sixty-two permissable address codes. The value of each control code is given in Table II. The control code index is used as an address into the table to locate the proper entry. The frame indicator is used to determine which frame of the entry is required.

When in the Net Test mode at the NCS, the 60-bit control codes generated will be permutations of the start code sequence. The first 60-bits generated, as indicated by a control code index of $100_8$, is a one-bit circular shift of the start code. All subsequent outputs will be successive 1-bit circular shifts of this 60-bits.

The output of this function, generated at the same rate as the input, is a single 30-bit data word routed to the Message Encoding and Message Decoding functions.

Table II

| ADDRESS (OCTAL) | TABLE OF CONTROL CODES | | |
|---|---|---|---|
| | CODE (OCTAL) | | |
| | FRAME 1 | FRAME 2 | REMARKS |
| 00 | 00000 00000 | 00000 00000 | CONTROL STOP |
| 01 | 05712 14101 | 65315 66447 | |
| 02 | 16136 24302 | 37526 33551 | |
| 03 | 13624 30203 | 52633 55116 | |
| 04 | 34274 50604 | 77254 67322 | |
| 05 | 31566 44705 | 12141 01765 | |
| 06 | 22342 74506 | 40772 54673 | |
| 07 | 27450 60407 | 25467 32234 | |
| 10 | 70571 21410 | 76531 56644 | |
| 11 | 75263 35511 | 13624 30203 | |
| 12 | 66447 05712 | 41017 65315 | |
| 13 | 63355 11613 | 24302 03752 | |
| 14 | 44705 71214 | 01765 31566 | |
| 15 | 41017 65315 | 64470 57121 | |
| 16 | 52633 55116 | 36243 02037 | |
| 17 | 57121 41017 | 53156 64470 | |
| 20 | 61362 43020 | 75263 35511 | |
| 21 | 64470 57121 | 10176 53156 | |
| 22 | 77254 67322 | 42745 06040 | |
| 23 | 72546 73223 | 27450 60407 | |
| 24 | 55116 13624 | 02037 52633 | |
| 25 | 50604 07725 | 67322 34274 | |
| 26 | 43020 37526 | 35511 61362 | |
| 27 | 46732 23427 | 50604 07725 | |
| 30 | 11613 62430 | 03752 63355 | |
| 31 | 14101 76531 | 66447 05712 | |
| 32 | 07725 46732 | 34274 50604 | |
| 33 | 02037 52633 | 51161 36243 | |
| 34 | 25467 32234 | 74506 04077 | |
| 35 | 20375 26335 | 11613 62430 | |
| 36 | 33551 16136 | 43020 37526 | |
| 37 | 36243 02037 | 26335 51161 | |
| 40 | 42745 06040 | 72546 73223 | |
| 41 | 47057 12141 | 17653 15664 | |
| 42 | 54673 22342 | 45060 40772 | |
| 43 | 51161 36243 | 20375 26335 | |
| 44 | 76531 56644 | 05712 14101 | |
| 45 | 73223 42745 | 60407 72546 | |
| 46 | 60407 72546 | 32234 27450 | |
| 47 | 65315 66447 | 57121 41017 | |
| 50 | 32234 27450 | 04077 25467 | |
| 51 | 37526 33551 | 61362 43020 | |
| 52 | 24302 03752 | 33551 16136 | |
| 53 | 21410 17653 | 56644 70571 | |
| 54 | 06040 77254 | 73223 42745 | |
| 55 | 03752 63355 | 16136 24302 | |
| 56 | 10176 53156 | 44705 71214 | |
| 57 | 15664 47057 | 21410 17653 | |
| 60 | 23427 45060 | 07725 46732 | |
| 61 | 26335 51161 | 62430 20375 | |
| 62 | 35511 61362 | 30203 75263 | |
| 63 | 30203 75263 | 55116 13624 | |
| 64 | 17653 15664 | 70571 21410 | |
| 65 | 12141 01765 | 15664 47057 | |
| 66 | 01765 31566 | 47057 12141 | |
| 67 | 04077 25467 | 22342 74506 | |
| 70 | 53156 64470 | 71214 10176 | |
| 71 | 56644 70571 | 14101 76531 | |
| 72 | 45060 40772 | 46732 23427 | |
| 73 | 40772 54673 | 23427 45060 | |
| 74 | 67322 34274 | 06040 77254 | |
| 75 | 62430 20375 | 63355 11613 | |
| 76 | 71214 10176 | 31566 44705 | |
| 77 | 77777 77777 | 77777 77777 | Picket Stop |
| 100 | 74506 04077 | 54673 22342 | Start |

Message Encoding

The input to the Message Encoding function is a 30-bit data word containing the information to be transmitted. The phase of each tone to be modulated is the phase of that tone in the previous frame, rotated by an odd multiple of 45° C determined by the bit-pair assigned to each tone. The initial phase of each tone is a multiple of 45°, having the value of 0°, 45°, 90°, 135°, 180°, 225°, 270°, or 315°, and a rotation of an odd multiple of 45° also produces one of these phases. The eight possible phases are represented by complex vectors with constant amplitude.

The required inputs to this function, generated every 13.3 ms. (Fast) or 22 ms. (Slow) while transmitting data, are:

a. A 30-bit data word from the EDAC Encoding or Control Code Generation function.

b. A set of 16 complex values representing the reference phase of each tone in the last header frame, when input a. is the first data frame, from the Header Generation function. The real and imaginary parts of each complex value have an accuracy of at least 12 bits.

This function translates 30-bits of data into 15 phases, one for each of the variable tones. A phase is also assigned to the constant Doppler tone.

The phase rotation, $\phi_r$, for each tone is defined as $$\phi_r(k) = (1 - 2d_{(2k-1)})(3 - 2d_{(2k-2)}) \times 45° \text{ for } k = 1,2,3,\ldots, 15$$

where $d_{(2k-1)}$ and $d_{(2k-2)}$ are odd/even bit pairs of the 30-bit data word. The transmitted phase, $\phi_t(k)$, for each tone is defined as $$\phi_t(k) = \phi_r(k) + \phi_p(k) \text{ for } k = 1,2,3,\ldots, 15$$

where $\phi_p$ are the transmitted phases from the previous frame or the reference phases from the Header Generation function. The complex phase representation of the variable tones, p(k) for k=1,2,2,...,15, are found from a table look-up of vectors for the eight possible phases. The phase of the 605 Hz Doppler tone, p(0), is always the same as the previous frame. The sixteen complex phase values are saved for the next execution of function.

The output of this function, generated at the same rate as the input, is a set of sixteen complex values representing the phase values to be modulated and is routed to the Signal Modulation function. The real and imaginary parts of each complex value have an accuracy of at least 12-bits.

Header Generation

All transmissions, except in the Net Synchronization mode, are preceded by five preamble frames, a phase reference frame, and a two frame start code or address code sequence. The modulated amplitude values for preamble, phase reference, and start code frames are obtained from precalculated tables. When transmitting in the Net Synchronization mode, the continuous stream of preamble frames are also obtained from the precalculated tables. The tables are so arranged that all phases are zero at the beginning of the reference frame by selection of the starting point for the first preamble frame.

The required inputs to this function, received from the Radio Set Input/Output function every 13.3 ms. (Fast) or 22 ms. (Slow), during header generation, are:
a. A frame type value.
b. The number of values to be generated.
c. A frame indicator having the value FIRST, INTERMEDIATE or LAST.

This function generates the required number of modulated amplitude values for a requested preamble, reference, or half of a start code frame.

When the frame type has the value zero, one, two, three, or four the even preamble, odd preamble, phase reference, start code 1, or start code 2 columns of Table III are used, respectively.

When the frame indicator has the value FIRST, the initial value retrieved from the table is from the entry for n=11 (Fast) or n=26 (Slow). When the frame indicator has the value INTERMEDIATE or LAST, the initial value retrieved from the table is from entry for n+1 (modulo 128) where n is the last entry retrieved in the previous frame. The number of values retrieved by each execution of this function is specified by input. Successive values of n (modulo 128) are used to obtain entries from the appropriate column of the table.

The even preamble, odd preamble, and phase reference columns of the table each contain 33 entries starting with zero. For n between 0 and 32, the entry corresponding to n is used. For n between 33 and 64, the entry corresponding to 64−n, but with sign reversed, is used. For n between 65 and 96, the entry corresponding to n−64, but with sign reversed, is used. For n between 97 and 127, the entry corresponding to 128−n is used.

The start code 1 and 2 columns of the table each contain 65 entries starting with zero. For n between 0 and 64, the entry corresponding to n is used. For n between 65 and 127, the entry corresponding to 128−n, but with sign reversed, is used.

In this manner the specified number of values are obtained. The values represented in Table III have been computed to reflect a maximum signal amplitude (+2047) in the first value of the reference frame.

When the frame indicator has the value LAST, a set of 16 reference phase is sent to the Message Encoding function to permit encoding of the first 30-bit data word. The last header frame generated, preceding a message sequence or address code, is always the phase reference frame or a start code 2 frame. When the phase reference frame is last, the reference phases are all zero. When the start code 2 is last, the reference phases represent the transmitted phases of this frame.

The outputs of this function, generated at the same rate as the input, are:
a. A set of 93 or 94 (Fast) real values or 154 or 155 (Slow) real values, as specified by input b., routed to the Radio Set Input/Output function. Each value has an accuracy of 12 bits, 11 bits plus sign.
b. A set of 16 complex reference phases, when the frame indicator has the value LAST, routed to the Message Encoding function. The real and imaginary parts of each complex value have an accuracy of 12 bits, 11 bits plus sign.

Table III
PREAMBLE, REFERENCE FRAME AND START CODE STORED VALUES

| Sample Number | Odd Preamble Frames (P1,P3 & P5) | Even Preamble Frames (P2 & P4) | Reference Frame | Start Frame 1 | Start Frame 2 |
|---|---|---|---|---|---|
| 0 | 241 | 722 | 2047 | −15 | 120 |
| 1 | 620 | 207 | 256 | 268 | 462 |
| 2 | 114 | 341 | −1011 | 621 | 198 |
| 3 | −35 | −12 | −216 | 370 | −41 |
| 4 | −134 | −401 | 18 | −790 | 198 |
| 5 | −653 | −218 | −177 | −603 | −215 |
| 6 | −240 | −719 | −73 | −95 | −894 |
| 7 | −580 | −193 | 129 | −53 | −535 |
| 8 | −92 | −276 | −296 | 19 | 909 |
| 9 | 106 | 35 | −4 | 411 | 262 |
| 10 | 153 | 458 | 150 | 169 | −678 |
| 11 | 680 | 227 | −84 | −485 | 253 |
| 12 | 236 | 709 | 431 | 413 | 461 |
| 13 | 535 | 178 | 180 | 372 | 307 |
| 14 | 70 | 210 | 112 | −230 | 80 |
| 15 | −176 | −59 | 109 | 229 | −114 |
| 16 | −170 | −511 | −255 | −50 | −255 |
| 17 | −701 | −234 | −242 | −353 | −387 |
| 18 | −230 | −691 | −352 | −153 | −118 |
| 19 | −485 | −162 | −148 | −1 | −160 |
| 20 | −47 | −141 | −122 | −562 | 126 |
| 21 | 243 | 81 | 159 | −325 | 59 |
| 22 | 186 | 558 | 321 | 926 | 158 |
| 23 | 715 | 238 | 129 | 624 | 452 |
| 24 | 222 | 667 | 399 | 19 | −361 |
| 25 | 430 | 143 | −9 | −319 | −15 |
| 26 | 24 | 71 | −52 | −142 | 577 |
| 27 | −309 | −103 | −34 | 341 | 125 |
| 28 | −200 | −601 | =344 | −180 | −286 |
| 29 | −722 | −241 | −89 | −368 | −479 |
| 30 | −212 | −637 | −202 | −290 | −390 |
| 31 | −371 | −124 | −69 | 26 | −210 |
| 32 | 0 | 0 | 0 | 85 | 482 |
| 33 | 371* | 124* | 69* | −156 | 102 |
| 34 | 212* | 637* | 202* | 300 | −333 |
| 35 | 722* | 241* | 89* | 306 | 603 |
| 36 | 200* | 601* | 344* | 316 | 380 |
| 37 | 309* | 103* | 35* | 93 | 49 |
| 38 | −24* | −71* | 52* | −288 | 49 |
| 39 | −430* | −143* | 9* | −282 | −425 |
| 40 | −222* | −667* | −399* | −176 | −637 |
| 41 | −715* | −238* | −129* | 498 | −95 |
| 42 | −186* | −558* | −321* | −187 | 633 |
| 43 | −243* | −81* | −159* | −884 | −138 |
| 44 | 47* | 141* | 122* | 31 | −393 |
| 45 | 485* | 162* | 148* | 378 | 169 |
| 46 | 230* | 691* | 352* | 226 | 66 |
| 47 | 701* | 234* | 242* | 327 | 158 |
| 48 | 170* | 511* | 255* | 652 | 255 |
| 49 | 176* | 59* | −109* | −62 | 496 |
| 50 | −70* | −210* | −112* | −649 | −58 |
| 51 | −535* | −178* | −180* | −255 | −491 |
| 52 | −236* | −709* | −431* | −358 | −61 |
| 53 | −680* | −227* | 84* | 293 | −420 |
| 54 | −153* | −458* | −150* | 294 | −356 |
| 55 | −106* | −35* | 4* | −524 | 3 |
| 56 | 92* | 276* | 296* | −84 | 242 |
| 57 | 580* | 193* | −129* | 356 | 470 |
| 58 | 240* | 719* | 73* | 174 | 454 |
| 59 | 653* | 218* | 177* | −36 | 153 |
| 60 | 134* | 401* | −18* | 470 | −671 |
| 61 | 35* | 12* | 216* | 158 | −96 |
| 62 | −113* | −341* | 1011* | −523 | 465 |
| 63 | −620* | −207* | −256* | 56 | −31 |

*These values will not be stored but are shown here for clarity.

Signal Modulation

The input to the Signal Modulation function is a set of sixteen complex values defining the phase to be modulated onto sixteen tones comprising the audio signal. All tones are odd harmonics of 55 Hz. Fifteen of the complex values have equal amplitude and the sixteenth, representing the Doppler correction tone, is adjusted to have twice the amplitude of the other tones. The Signal Modulation function converts these adjusted complex values into a sequential set of real values representing sample values of the audio signal. The algorithm for this conversion incorporates an Inverse Fast Fourier Transform (IFFT). The derivation of the algorithm is given below at the end of this section. An alternate method of effecting the phase shift modulation is to use a table look up approach instead of the IFFT. The signal modulation operation for Header frames is accomplished within the Header Generation function.

The input to this function is a set of sixteen complex phase defining values every 13.3 ms. (Fast) or 22 ms. (Slow) while transmitting data from the Message Encoding function. The real and imaginary parts of each complex value have an accuracy of at least 12 bits.

This function adjusts the amplitudes of sixteen complex values and converts them into 128 real values representing sample values of the audio signal.

The input sixteen complex values may be expressed as $$H(m) = A e^{i\phi_l(2m+1)} \text{ for } m = 5, 8 \text{ to } 21, 26$$

where $i = \sqrt{-1}$, $\phi_l$ are the transmitted phases at frequencies $(2m+1)$ 55 Hz and the input amplitudes, A, are all equal.

The amplitude of the Doppler correction tone (m = 5) in the transmitted audio signal is to be twice the amplitude of the individual data tones. This is accomplished by multiplying H(5) by 2. The amplitudes of the sixteen complex values are adjusted so that the maximum output value (representing the case when all tones are of zero phase) uses the full range of the 12-bit digital-to-analog converter 26, i.e., a decimal number of 2047. For the "zero phase" condition, the amplitudes of the 16 F(m) values (15 of amplitude A, one of amplitude 2A) would add directly giving an output amplitude of $17A2^{-s}$ where s is the scaling factor within the IFFT algorithm. The maximum output is limited to 2047 by multiplying the input values by $$B = 2047/(17A2^{-s})$$

The amplitude adjusted values, denoted by G(m), are $$G(m) = BH(m) \text{ for } m = 8 \text{ to } 21, 26$$
$$= 2BH(m) \text{ for } m = 5$$

A base 4, N = 64 IFFT algorithm is used to compute an inverse discrete Fourier transform defined as $$T(k) = x(k) + iy(k) = 2^{-s} \sum_{j=0}^{63} G(j) e^{i2\pi jk/64} \quad k = 0,1,\ldots 63$$

where

T(k) = the complex $k^{th}$ coefficient of the IFFT of the input array
x(k) = real part of T(k)
y(k) = imaginary part of T(k) s = scale factor
G(j) = the $j^{th}$ complex value of the input array
$i = \sqrt{-1}$ The output array of the IFFT, T(k), is in scrambled order. The array is rearranged into natural order, G(k), as follows:

$$G(k_0, k_1, k_2) = T(k_2, k_1, k_0) \text{ for } k_0, k_1, k_2 = 0, 1, 2, 3$$

The 64 complex numbers obtained from the IFFT are used to compute 64 real output values g(k) by means of $$g(k) \cos(2\pi k/128) - y(k) \sin(2\pi k/128)$$

$$k = 0, 1, \ldots .63$$

The other 64 real output values are obtained from $$g(k = i4) = -g(k) \text{ for } k = 0,1,\ldots 63$$

The output of this function is one set of 128 real values generated at the same rate as the input. The values represent sample values used to generate the audio signal. The values are scaled so that the maximum possible output for this function has a value of 2047 (significance of 12 bits). The output values are always routed to the Radio Set Input/Output function.

The derivation of the algorithm used for converting the adjusted complex values into a sequential set of real values representing sample values of the audio signal will now be given. The algorithm is not restricted to the Ling-11 tone frequencies but it is restricted to tone frequencies which are odd harmonics of a common base frequency.

Consider a function represented by N complex values of components in the frequency domain $$G(n) = X(n) + iY(n) = A(n)e^{i\phi(n)} \quad n = 0, 1, \ldots, N-1 \quad (1)$$

where
n = harmonic numbers of a common frequency
$f = 1/T_o$
$i = \sqrt{-1}$
X = real part of G
Y = imaginary part of G
A = magnitude of G
$\phi$ = phase of G Some of the G(n) may be zero. Sample values in the time domain may be represented by the inverse discrete Fourier transform $$g(k) = \frac{1}{N} \sum_{n=0}^{N-1} G(n) e^{i2\pi nk/N} \quad k = 0,1,\ldots N-1 \quad (2)$$

where the k samples are spaced at an interval of $T_o/N$. This relation assumes a periodic extension outside the period $T_o = 1/f$ and is discussed in detail in Brigham "The Fast Fourier Transform". In the case of interest, a 18.18 ms time period is to be represented by 128 samples spaced at 142 microsecond intervals.

The indices n and k are to be interpreted modulo N so that $G(-n) = G(N-n)$. Using this, equation (2) may be written as (for N = 128).

$$g(k) = \frac{1}{128} \sum_{n=-64}^{63} G(n) e^{i2\pi nk/N} \quad k = 0,1,\ldots, N-1 \quad (3)$$

For real time functions, the real part, $X(n)$, of $G(n)$ is even about $n=0$ (about $N/2$ in equation 2) and the imaginary part is odd about zero.

Then $$G(-n) = A(n)e^{-i\phi(n)} \tag{4}$$

The sum of pairs of terms for $\pm n$ in the summation (3) is $$S(n) = G(n)e^{j2\pi nk/128} + G(-n)e^{-j2\pi nk/128} \tag{5}$$
$$= 2A(n)\cos[2\pi nk/128 + \phi(n)] \; n = 1,2,\ldots 63$$

The two unpaired terms in the summation (3) give $$S(O) + S(-64) = G(O) + G(-64)e^{j2\pi(-64)k/128} \tag{5A}$$
$$= G(O) + (-1)^k G(-64)$$

Using the identity for the cosine of the sum of two angles gives $$S(n) = 2A(n)\cos\phi(n)\cos(2\pi nk/128) - \tag{6}$$
$$2A(n)\sin\phi(n)\sin(2\pi nk/128)$$
$$= 2X(n)\cos(2\pi nk/128) - 2Y(n)\sin(2\pi nk/128)$$

Substituting (5A) and (6) into equation (3) gives $$g(k) = \frac{1}{64} \sum_{n=1}^{63} S(n)\cos(2\pi nk/128) - \tag{7}$$
$$Y(n)\sin(2\pi nk/128) +$$
$$\frac{1}{128} G(O) + \frac{(-1)^k}{128} G(-64)$$

Use of the fact that only odd harmonics of 55 Hz are used in the Link-11 tone library eliminates the $G(0)$ and $G(-64)$ terms and leads to further simplification. Each tone has an odd number of cycles in 18.18 ms and an odd number of half cycles in 9.09 ms (64 samples) so that $$g(k+64) = -g(k) \tag{8}$$

Thus only 64 values need to be computed by means of a transform and the other 64 values determined from (8). Let $n = 2m+1$ in (7) to give $$g(k) = \frac{1}{64} \sum_{m=0}^{31} X(2m+1)\cos[2\pi(2m+1)k/128] - \tag{9}$$
$$Y(2m+1)\sin[2\pi(2m+1)k/128]$$

Using the trigonometric expansions for the cosine and sine of two angles gives $$64g(k) = \cos(2\pi k/128) \sum_{m=0}^{31} X(2m+1)\cos(2\pi mk/64) - \tag{10}$$
$$Y(2m+1)\sin(2\pi mk/64)$$
$$+ \sin(2\pi k/128) \sum_{m=0}^{31} -X(2m+1)\sin(2\pi mk/64) -$$
$$Y(2m+1)\cos(2\pi mk/64)$$

which may be expressed more compactly as $$64g(k) = Re[e^{j2\pi k/128} \sum_{m=0}^{31} G(2m+1)e^{j2\pi mk/64}] \; k = 0,1,\ldots 63 \tag{11}$$

where
Re = real part of

Since only 16 non-zero values of G are used to compute 64 time values, there may be possible simplifications in the IFFT algorithm.

The steps in the modulation process are
1. Compute 64 point IFFT
2. Perform 128 real multiplications i.e.
   $\cos(2\pi k/128)$ times 64 real components
   $\sin(2\pi k/128)$ times 64 imaginary components
   to obtain 64 values of $g(k)$
3. Use $g(k+64) = -g(k)$ for the remaining 64 values.

Signal Demodulation

The received data signal, which was redundantly transmitted in each sideband, is in the form of in-phase and quadrature components of the signal. Each pair of components is treated as a complex sample consisting of real and imaginary parts. The data signal is comprised of tones located at odd harmonics of 55 Hz. These tones are frequency shifted to locate the tones at harmonics of 110 Hz and to compensate for any Doppler correction required. The data signal is demodulated by the discrete complex Fast Fourier Transform (FFT) computation which converts from the time to the frequency domain.

The required inputs to this function are:
a. Either one or two sets of 32 complex values for the USB and/or LSB, representing the sampled data signal every 9.09 ms. for the Fast or Slow data rates before receive transition framing is established. The values are received from the Radio Set Input/Output function. The real and imaginary parts of each complex value have an accuracy of 12 bits. Or:
b. One or two sets of 32 complex values, for the USB and/or LSB, representing the sampled data signal every 13.3 ms. for the Fast data rate after receive transition framing is established. The values are received from the Radio Set Input/Output function. The real and imaginary parts of each complex value have an accuracy of 12 bits. Or:
c. One or two sets of 64 complex values for the USB and/or LSB, representing the sampled data signal every 22 ms. for the Slow data rate after receive transition framing is established. The values are received from the Radio Set Input/Output function. The real and imaginary parts of each complex value have an accuracy of 12 bits.
d. One or two sets of 32 complex values, for the USB and/or LSB, representing frequency correction factors from the internally stored values before signal presence has been detected, or frequency and initial Doppler correction factors from the Signal Presence function, or frequency and refined Doppler correction factors from the Frame Synchronization function. The values are received at the same rate as inputs a, b, or c. The real and imaginary parts of each complex value have an accuracy of at least 12 bits.

This function demodulates the received data signals into the desired frequency components and computes the amplitude of certain components.

The processing performed by this function is applied to both sidebands when the SB SEL switch has the value DIV or AUTO and the data terminal is in the receive state. Otherwise only the selected sideband is processed.

When either input a or b is received, the input data signal set D(k) is multiplied by the appropriate set of corrections factors to change the contained frequencies from odd multiples of 55 Hz to multiples of 110 Hz and to correct for Doppler shift, when the Doppler correction has been estimated. The corrected data signal set, S(k), is defined as $$S(k) = C(k) * D(k) \text{ for } k = 0,1,2,\ldots,31$$

where C(k) is the set of correction factors and * denotes the complex multiplication operator. When input c. is received, the first and second halves are coherently combined before being multiplied by the correction factors. The corrected data signal set, S(k), is now defined as $$S(k) = C(k) * ((D(k) + D(k+32))/2) \text{ for } k = 0,1,2,\ldots,31$$

where C(k) and * are as defined above and + denotes the complex addition operator.

This discrete FFT is applied to the corrected data signal set to convert the time signal samples S(k) into complex frequency components F(m), and is defined as $$F(m) = \sum_{k=0}^{31} S(k) e^{-i2\pi \frac{mk}{32}} \text{ for } m = 0,1,2,\ldots,31$$

where $i = \sqrt{-1}$. A computational algorithm utilizing radix "4+4+2" symmetry can be used to reduce the number of complex additions and multiplications required to eliminate the need for trigonometric functions by using table look-up. This is further described in *The Fast Fourier Transform* by E. O. Brigham, Prentice Hall, Inc., 1974.

The outputs of the FFT, complex frequency components, are in a bit reversed order. Since only 15 of the 32 components, m=8 through 21 and 26 need be retained, a minimum of rearranging is required. This is accomplished by placing the frequency components 4,12,20,28,6,14,22,30,1,9,17,25,3,11, and 21 sequentially into the array of the retained frequency components.

The real amplitude of ten frequency components, computed as amplitudes squared to eliminate the need for a square root function, A(m), is defined as $$A(m) = F_r^2(m) + F_i^2(m) \text{ for}$$
$$m = 4,5,6,14,15,16,23,25,26,27$$

where the subscripts r and i denote the real and imaginary parts of frequency component F(m). A measure of received signal quality is the ratio of A(5) to A(23). When both sidebands are present, the greater of the two quantities is sent to the Link Control function.

When the value of the Receive Processing Index has just changed from a zero to a one (signal presence detected) a frame counter is initialized to the value zero. This value is incremented by one each time this function is subsequently executed while the RPI has the value one.

When the RPI has the value two (frame synchronization achieved) at a Picket station during the Net Sync mode, the RPI is reset to the value one and the frame counter reset to the value zero, and incremented as described above, to continue the frame synchronization process.

The destination and quantity of the outputs of this function are dependent upon the current value of the Receive Processing Index. All of the outputs are generated at the same rate as inputs a, b, or c. The real and imaginary parts of all complex values, and all real values, have an accuracy of at least 12 bits.

a. RPI=0 (signal presence not detected). One of two sets of nine real amplitude squared values, for the USB and/or LSB, for m=4,5,6,14,15,16,25,26, and 27 are routed to the Signal Presence function.

b. RPI=1 (signal presence detected). One or two sets of frequency components, for the USB and/or LSB, for m=5 and 26 and one or two sets of 32 complex corrected data signal values, for the USB and/or LSB, and the frame counter described previously. These values are routed to the Frame Synchronization function.

c. RPI=2 (frame synchronization achieved). One or two sets of six real amplitude squared values, for the USB and/or LSB, for m=14,15,16,25,26, and 27 and one or two sets of 15 complex frequency components, for the USB and/or LSB, for m=8 through 21, and 26. These values are routed to the Phase Reference function.

d. RPI≥3 (after phase reference detected). One or two sets of 15 complex frequency components, for the USB and/or LSB, for m=8 through 21, and 26 are routed to the Message Decoding function. The measured signal quality value is routed to the Link Control function.

Signal Presence

While neither transmitting nor receiving a message the data terminal continually demodulates data samples from the Radio Set Interface hardware. Signal presence is detected by comparing the energy received within 110 Hz of the Doppler correction, frame synchronization, and data tones. The acceptance of a preamble frame permits an estimation of the Doppler shift if any, to be incorporated into the frequency shift correction operation performed by the Signal Demodulation function.

The input to this function is one or two sets of 9 real amplitude squared values, for the USB and/or LSB, every 9.09 ms. from the Signal Demodulation function until signal presence is detected. Each value has an accuracy of at least 12 bits.

This function determines whether or not the sampled demodulated signal contains a preamble frame, and if so, computes the apparent Doppler shift and a set of frequency and Doppler correction factors.

$A_m$ for m=4,5,6,14,15,16,25,26, and 27 represents the amplitude squared value of the corresponding frequency component $F_m$. If the sum of $A_4$, $A_5$, and $A_6$ is greater than the sum of $A_{25}$, $A_{26}$, and $A_{27}$, and four times greater than the sum of $A_{14}$, $A_{15}$, and $A_{16}$, for either sideband, then signal presence has been detected. If the preceding condition is not met, then signal presence has not been detected and no further processing is performed by this function.

When signal presence is detected the Receive Processing Index is set to the value one to indicate this condition. If the data terminal is in the transmit state, no further processing is performed. If the data terminal is in the receive state and the DOP COR switch has the value ON, a preliminary estimate of the Doppler shift is made. When $A_4$ and $A_6$ are very small, the Doppler shift is considered to be zero and no further processing is performed. The Doppler shift is positive for the USB and negative for the LSB when $A_6$ is greater than $A_4$. The Doppler shift is negative for the USB and positive for the LSB when $A_4$ is greater than $A_6$. The Doppler shift, d, is defined as $$d = 32/\pi \tan^{-1} \frac{\sin \pi/32}{\sqrt{A_5/A_j} + \cos \pi/32}$$

where j=6 for a positive shift on the USB or a negative shift on the LSB or j=4 for a negative shift on the USB or a positive shift on the LSB.

The set of correction factors, C(k), incorporating frequency and Doppler shift, is defined as $$C_r(k) = \cos 2\pi \left( \frac{k}{64} + \frac{kd}{32} \right) \text{ and}$$

$$C_i(k) = -\sin 2\pi \left( \frac{k}{64} + \frac{kd}{32} \right)$$

for k=0,1,2, ... ,31 where the subscripts r and i denote the real and imaginary parts of each complex value. One set of correction factors is computed for each sideband present.

The output of this function is one or two sets of complex correction factors, for the USB and/or LSB, routed to the Signal Demodulation function. The real and imaginary parts of each complex value have an accuracy of at least 12 bits.

Frame Synchronization

After signal presence has been detected and the Doppler shift has been estimated, the following preamble frames are examined to determine the position of the frame boundary. Because the frame synchronization tone is phase shifted 180° at each frame boundary, the demodulated output for the synchronization tone from a sample which straddles a frame boundary will result in partial cancellation. When the sample is exactly centered across a frame boundary, complete cancellation will result. By incrementally shifting the sample period one sample at a time the position of the frame boundary is determined.

The algorithm used by the Signal Presence function for Doppler correction is quite sensitive to SNR. A more precise frequency correction is obtained from the differential phase of the tone m=5, after the preliminary correction has been made.

The required inputs to this function are:

a. One or two sets of two complex values, for the USB and/or LSB, representing frequency components m=5 and 26 from the Signal Demoulation function every 9.09 ms. The real and imaginary parts of each complex value have an accuracy of at least 12 bits.

b. One or two sets of 32 complex values, for the USB and/or LSB, representing corrected data signal values from the Signal Demodulation function every 9.09 ms. The real and imaginary parts of each complex value have an accuracy of at least 12 bits.

c. A frame counter, having the value 0,1, or 2 (Fast) of 0,1,2, or 3 (Slow) from the Signal Demodulation function every 9.09 ms.

This function determines the position of the frame boundary within a sequence of preamble frames and computes a refined Doppler correction from the phase of the Doppler tone in successive frames.

When the frame counter has the value zero and the data terminal is in the transmit state, the RPI is set to two to eliminate additional inputs to this function and no further processing is performed. When the data terminal is in the receive state, the frequency component for m=5 is saved as $F_5(0)$, the frequency component for m=26 is saved as $F_{26}(0)$, the corrected data signal values are saved as S(0) through S(31), and no further processing is performed for this input.

When the frame counter has a value other than zero, the frequency component for m=5 is saved as $F_5(j)$, the frequency component for m=26 is saved as $F_{26}(j)$, and the corrected data signal values are saved as S(j) through S(j+31) where j is equal to 32 times the value of the frame counter. Thirty-two demodulated amplitude values for the synchronization tone m=26 are now computed. The intermediate values of $F_{26}$ are defined, recursively, as $$F_{26}(j+n+1) = e^{j2\pi 26/32}\{F_{26}(j+n) + 2^{-s}(S(j+n+32) - S(j+n))\} \text{ for } n=0 \text{ through } 31$$

where s is a scaling factor and complex arithmetic is implied between complex values. The amplitude squared value, $A_{26}$, of each computed value of $F_{26}$ is defined as $$A_{26}(j+n) = \text{real } F_{26}(j+n)^2 + \text{imaginary } F_{26}(j+n)^2 \text{ for } n=0 \text{ through } 31.$$

When the frame counter has the value two (Fast) or three (Slow) a sufficient number of amplitude squared values have been computed to insure that a shifted sample period is centered across a frame boundary. The value of l, corresponding to the $A_{26}(l)$ having a minimum value, represents the frame transition boundary in relation to the first input values received. When both sidebands are being processed, the smallest value of $A_{26}(l)$ is used. The RPI is set to the value two to indicate that frame synchronization has been completed. The value ON for the SYNC status indicator is sent to the Man/Machine function only at a Picket Station during Net Sync mode.

When the frame counter has the value two (Fast) or three (Slow) a refined Doppler correction is computed only when the DOP CR switch on console 22 has the value ON. The estimated Doppler frequency shift, $f_d$, in this case is defined as $$f_d = \frac{\phi_5(j) - \phi_5(0)}{2\pi \times T \times 9.09 \times 10^{-3}}$$

where $\phi_5$ is $\tan^{-1}$ (real $F_5$/imaginary $F_5$), j=64 (Fast) or 96 (Slow) and T=2 (Fast) or 3 (Slow). A set of correction factors, C(k), reflecting frequency and refined Doppler shift, is defined as $$C_r(k) = \cos 2\pi \left( \frac{k}{64} + \frac{kf_d}{3520} \right) \text{ and}$$

$$C_i(k) = -\sin 2\pi \left( \frac{k}{64} + \frac{kf_d}{3520} \right)$$

for k=0,1,2, ... ,31 where the subscripts r and i denote the real and imaginary parts.

The outputs of this function are:

a. A frame transition value to the Radio Set Input/Output function.

b. One or two sets of 32 complex correction factors, for the USB and/or LSB, to the Signal Demodulation function.

c. A status value for the SYNC status indicator to the Man/Machine function.

Phase Reference

After frame synchronization has been achieved, the center 32 complex sample values for the Fast data rate or the center 64 complex sample values for the Slow data rate will be demodulated into 32 complex frequency components. The received phase reference frame contains the reference phases for the tones of interest, m=8 through 21, and 26.

The inputs to this function are:

a. One or two sets of 6 real amplitude squared values, for the USB and/or LSB, from the Signal Demodulation function. Each value has an accuracy of at least 12 bits.

b. One or two sets of 15 frequency components, for the USB and/or LSB, for m=8 through 21, and 26, from the Signal Demodulation function. The real and imaginary parts of each complex value have an accuracy of at least 12 bits.

This function determines whether or not the samples demodulated signal contains a phase reference frame.

$A_m$ for m=14,15,16,25,26, and 27 represents the amplitude squared value of the corresponding frequency component $F_m$. If, for either sideband, the sum of $A_{14}$, $A_{15}$, and $A_{16}$ is two times greater than the sum of $A_{25}$, $A_{26}$, and $A_{27}$, a reference frame has been detected. If the preceding condition is not met, then a reference frame has not been detected.

When a phase reference frame is detected, the Receive Processing Index is set to three (reference frame detected) and frequency components for m=8 through 21, and 26, the reference phases, are sent to the Message Decoding function to permit decoding of the first data frame. When the SB SEL console 22 switch has the value DIV or AUTO, the frequency components of the USB and LSB are coherently combined to form the reference phases of the diversity combination signal, $R_d$, which is defined as $R_d(m)=(F_u(m)+F_l(m))/2$ for m=8 through 21, and 26 where the subscripts u and l USB and LSB, and + implies the complex addition operator.

The only output of this function is one (SB SEL=USB, LSB, or DIV) or three (SB SEL=AUTO) sets of 15 reference phase routed to the Message Decoding function. The real and imaginary parts of each complex value has an accuracy of at least 12 bits.

Message Decoding

The input to the Message Decoding function is in the form of complex frequency components for each data tone. To extract the data bit-pair contained in each tone, it is necessary to compute the phase difference between the phase of a tone in the current frame and the phase of that corresponding tone in the previous frame. When the computed phase difference is within 22½° of an odd multiple of 45°, both data bits are considered certain. When it is not, one of the data bits is considered uncertain. Fifteen data bit-pairs are computed for the upper, lower and diversity combination signals.

Propagation anomalies, noise and interference are likely to produce a difference in the received signal for the two sidebands but a coherent combination of the two signals is expected to enhance the signal quality by partially cancelling the noise. To minimize the number of demodulation operations required, the diversity combination of the sidebands is formed after the demodulation of each of the separate sidebands when the SB SEL switch has the value DIV or AUTO.

The inputs to this function are:

a. One or two sets of 15 frequency components, for the USB and/or LSB, for m=8 through 21 and 26 from the Signal Demodulation function every 13.33 ms. (Fast) or 22 ms. (Slow) after header processing is complete. The real and imaginary parts of each complex value have an accuracy of at least 12 bits.

b. One (SB SEL=USB, LSB, or DIV) or three (SB SEL=AUTO) sets of reference phases, for m=8 through 21 and 26 from the Phase Reference function only in the case of the first data frame. The real and imaginary parts of each complex value have an accuracy of at least 12 bits.

c. A 30-bit data word from the EDAC Encoding or Control Code Generation function while the data terminal is in the transmit state.

This function computes the data bit-pair information conveyed by each demodulated tone. It also computes certainty bit-pairs associated with each data bit-pair computed.

When the SB SEL switch has the value DIV or AUTO, the two sets of frequency components received from the Signal Demodulation function are coherently combined to form the diversity combination signal, $F_d$, which is defined as $$F_d(k)=(F_u(k)+F_l(k))/2 \text{ for } k=1,2,3,\ldots,15$$

where the subscripts u and l denote the USB and LSB, and + implies the complex addition operator.

The complex phase difference P, for any sideband, is defined as $$P_s(k)=F_s(k)*G_s(k) \text{ for } k=1,2,3,\ldots,15$$

where s denotes the upper (u), lower (l), or diversity combination (d) sideband, F represents the input or computed frequency components, G represents the frequency components from the previous frame or reference phases for the first data frame, and * implies the complex conjugate multiplication operator.

When the SB SEL switch has the value USB, only $P_u$ is computed. When the value is LSB, only $P_l$ is computed. When the value is DIV, only $P_d$ is computed. When the value is AUTO, $P_u$, $P_l$, and $P_d$ are computed. These values are saved for the next execution of this function.

Two bits of data are decoded from each phase difference value. Data bits $d_s(2k-2)$ and $d_s(2k-1)$ are derived from $P_s(k)$ providing data bits $d_s(0)$ through $d_s(29)$ for k ranging from 1 through 15. For each tone the even numbered data bit, $d_s(2k-2)$, has the value 1 if the real part of the corresponding phase difference $P_s(k)$ is positive (angle between −90° and +90°) and has the value 0 if the real part is negative (angle between 90° and 270°). The odd numbered data bit, $d_s(2k-1)$, has the value 0 if the imaginary part of $P_s(k)$ is positive. (angle between 180° and 360°) and has the value 0 if the imaginary part is negative (angle between 0° and 180°). This scheme is shown in Table IV. Data words, $D_u$, $D_l$, and $D_d$ are computed only when phase difference $P_u$, $P_l$, and $P_d$, respectively, have been computed.

When the data terminal is in the receive state, the decoded data words are sent to the Control Code Recognition function. When in the transmit state, the decoded data word is compared with the data word received from the EDAC Encoding or Control Code Generation function. If the two data words are identical, then there is no output from this function. If the data words disagree, a value of ON for the XMT DATA ERR status indicator is sent to the Man/Machine function as the only output of this function.

The output of this function is one of the following:

a. One (SB SEL=USB, LSB, or DIV) or three (SB SEL=AUTO) 30-bit data words to the Control Code Recognition function when in the receive state.

b. A status value for the XMT DATA ERR indicator to the Man/Machine function and an error notification to the Built-In Test function when in the transmit state.

Table IV

| Data Bit-Pair Assignments | | | |
|---|---|---|---|
| Sign of | | Data bit | |
| Imaginary Part | Real Part | Odd | Even |
| Positive | Positive | 0 | 1 |
| Positive | Negative | 0 | 0 |
| Negative | Negative | 1 | 0 |
| Negative | Positive | 1 | 1 |

Control Code Recognition

Control codes are transmitted in two frames, each of 30 bits. Control code frames do not contain data and are not Hamming decoded. Each received 30-bit data word is compared with the first frame of one of the stored codes if the previous data word was not accepted as the first frame of a control code. Otherwise the data word is compared with the second frame of the control code previously accepted. When two successive frames disagree with one of the stored control code sequences in no more than four bit positions, the received frame pair is considered to have conveyed the specific control code.

The input to this function is one of the following:

a. One (SB SEL=USB, LSB, or DIV) or three (SB SEL=AUTO) 30-bit data words from the Message Decoding function.

b. A 60-bit ownship address code from the Man/Machine function.

This function determines whether or not a data word is to be accepted as containing the first or second frame of an ownship address, start, control stop, or picket stop code sequence.

When the 60-bit ownship address code is received, it is stored for subsequent use by this function until another value is received. The octal values of the prestored control codes are:

| Control Code | First Frame | Second Frame |
|---|---|---|
| Start | 74506 04077 | 54673 22342 |
| Control Stop | 00000 00000 | 00000 00000 |
| Picket Stop | 77777 77777 | 77777 77777 |

These four control codes are referred to as the "stored control codes".

When a data word is received, and the previous frame was accepted as the first frame of a control code, it is EXCLUSIVE ORed with the second frame of that stored control code. If the total number of bits set resulting from the EXCLUSIVE OR operation for this frame and the previous frame is less than or equal to four, the frame pair is accepted as the control code sequence. If the data word is not accepted as the second frame of a control code or if the previous data word was not accepted as the first frame of a control code, the data word is EXCLUSIVE ORed with the first frame of each stored control code. When the number of bits resulting from any EXCLUSIVE OR operation is less than or equal to four, the frame is accepted as the first frame of that control code. In this case, the number of bit disagreements and an indication of the control code is saved for testing the next frame.

When the SB SEL switch has the value AUTO, the three data words are tested as above in the following order or priority: Diversity combination, USB, and LSB. The first pair of data words for the same sideband that meet the above tests is accepted as the control code sequence.

When a phase reference frame has been detected in the previous frame (RPI=3), the next two data words are expected to contain a control code. If a control code is found, an accepted control code value is sent to the Link Control function. If none is found, a no control code value is sent. In either case the two data words are neither EDAC decoded nor sent to the NTDS Input/Output function.

After a start code sequence has been accepted (RPI=4), the data word corresponding to an accepted control code first frame is not EDAC decoded but sent to the NTDS Input/Output function after bit positions 24 through 29 are set to zero. A data word that is not a control code first or second frame is sent to the EDAC Decoding function without alteration.

When a stop code sequence has been accepted in the previous frame (RPI=5) at a Picket Station in Roll Call mode, the next two data words are expected to control an address code. If one is found, an accepted control code value is sent to the Link Control function. If one is not found, a no control code value is sent. In either case the two data words are neither EDAC decoded nor sent to the NTDS Input/Output function.

When a control code sequence is accepted and there is at least a 1-bit disagreement with the stored control code, a value of ON for the CODE ERR status indicator is sent to the Man/Machine function and an error notification is sent to the Built-In Test function to display the appropriate error message.

When in the Net Test mode at a Picket Station the pairs of data words following the start code sequence are successive 1-bit circular shifts of the 60-bit start code. If an error is detected, the value ON for the RCV DATA ERR status indicator is sent to the Man/Machine function and an error notification is sent to the Built-In Test function to display the appropriate error message.

The output of this function is one of the following:

a. One (SB SEL=USB, LSB, or DIV) or three (SB SEL=AUTO) 30-bit data words routed to the EDAC Decoding function.

b. One 26-bit data word routed to the NTDS Input/Output function.

c. A value representing an accepted/no control code sequence routed to the Link Control function.

d. A status value and item indicator routed to the Man/-Machine function and an error notification to the Built-In Test function.

EDAC Decoding

The 30-bit data word which is used to modulate the transmitted signal consists of the 24 information bits from the NTDS computer and six redundancy bits forming a (30,24) Hamming code for error detection and correction (EDAC). The received 30-bit data word can be inspected to determine if it is apparently error free, contains a correctable error, or contains uncorrectable errors.

The only input to this function is one (SB SEL=USB, LSB, or DIV) or three (SB SEL=AUTO) 30-bit data words from the Control Code Recognition function.

This function examines the 30-bit data words to determine if they are error free, contain a correctable error, or contain uncorrectable error. Correctable errors are corrected when in Correct mode. When in automatic sideband selection mode, a preferred signal is selected for output. If not in automatic sideband selection mode, the indicated sideband is processed.

The EDAC decoding process uses the same 5-bit patterns as the EDAC encoding process. Each of the three data words (upper, lower, and diversity), if present, are logically ANDed with each of the five bit patterns to generate partial words. The parity of each partial word is established as a zero for even parity and a one for odd parity. The overall parity of each data word, without ANDing, is also determined. Designating the overall parity as F, and the parities of the groups containing bits 29, 28, 27, 26 and 25 as E,D,C,B, and A respectively, a 5-bit parity address EDCBA is formed for each data word.

If the overall parity F is 1 (odd), and EDCBA = $11111_2$, the received data word is assumed to be error free. If the overall parity F is 0 (even), and EDCBA is not 0 or 1, the received data word is assumed to have a correctable error. The binary parity address EDCBA is used to determine which bit could be changed to make all parities correct (odd). The 30 remaining values of EDCBA correspond to bit positions 0 through 29, and the bit position to be complemented is found by using EDCBA as an index to a table containing the desired bit position (see Table V). For all other combinations of F and EDCBA, the received data word is assumed to have uncorrectable errors.

When a correctable error has been detected and the ERR CORR switch has the value C (detect and correct), error correction is effected by complementing the value of the bit whose position is found by indexing into the table. Corrections are not made when the ERR CORR switch has the value L (detect and label). The six redundancy bits in bits 24 through 29 of the data word are deleted and two error status bits in bits 24 and 25 are added. Bits 24 and 25 are both set to zero when no error has been detected, and are both set to one when a correctable error has been detected. Bit 24 is set to one and bit 25 to zero when F is even and EDCBA=0 or 1. Bit 24 is set to zero and bit 25 set to one when F is odd and EDCBA is not equal to $11111_2$.

When the SB SEL switch has the value USB, LSB, or DIV, the decoded information word for that sideband is selected for output. When the SB SEL switch has the value AUTO, the three decoded information words are examined in the following order of priority: Diversity combination, USB, and LSB. First, a search is made for the first information word with no error. If one is found, that information word is selected for output. If none is found, then a search is made for the first information word with a correctable error. If one is found, that information word is elected for output. If neither of the above searches are successful, the diversity combination information word is selected for output.

The output of this function is a 26-bit word, generated at the same rate as input and routed to the NTDS Input/Output function, consisting of:

a. Twenty-four bits of information, and b. Two bits indicating that the selected information word is error free or contained either correctable or uncorrectable errors.

Better error control may be achieved by expansion of the decoding process to utilize the certainty indicators, generated by the Message Decoding function, in conjunction with the error correction process.

Table V

| HAMMING ERROR CORRECTION | | | |
|---|---|---|---|
| Binary Value of EDCBA | Bit Position | Binary Value of EDCBA | Bit Position |
| 00010 | 23 | 10001 | 9 |
| 00011 | 22 | 10010 | 8 |
| 00100 | 21 | 10011 | 7 |
| 00101 | 20 | 10100 | 6 |
| 00110 | 19 | 10101 | 5 |
| 00111 | 18 | 10110 | 4 |
| 01000 | 17 | 10111 | 28 |
| 01001 | 16 | 11000 | 3 |
| 01010 | 15 | 11001 | 2 |
| 01011 | 14 | 11010 | 1 |
| 01100 | 13 | 11011 | 27 |
| 01101 | 12 | 11100 | 0 |
| 01110 | 11 | 11101 | 26 |
| 01111 | 29 | 11110 | 25 |
| 10000 | 10 | 11111 | 24 |

NTDS Input/Output

The data terminal is connected to the NTDS computer either directly or through a cryptographic device. The interface is logically identical in either case, except that additional frames which the data terminal will treat as data are used by the cryptographic device 16.

In the receive state, the input to this function is one of the following:

a. A prepare to Receive, End of Receive, or Reset request from the Link Control function.

b. A 26-bit data word from the EDAC Decoding or Control Code Recognition function.

c. An output complete interrupt generated as the result of a data word being accepted by the NTDS computer 14.

In the transmit state, the input to this function is one of the following:

a. A Prepare to Transmit-Roll Call, Prepare to Transmit-Broadcast, or Reset request from the Link Control function.

b. An input complete interrupt generated as the result of a data word being received from the NTDS computer.

c. A next word request from the Link Control function indicating that the previous word has been processed.

d. A timeout expired notification from the Executive function.

This function initiates, manages, and terminates all data transfers between the digital processor and the NTDS computer. The processing performed by this function is in response to the particular input received and whether the data terminal is in the receive or transmit state.

(1) In the receive state:

When the Prepare to Receive request is received an External Function (Code 6) is sent to the NTDS computer. When the End of Receive request is received an External Function (Code 3) is sent to the NTDS computer. When the Reset request is received an External Function (Code 2) is sent to the NTDS computer.

When a 26-bit data word is received and the previous output operation has completed, an output chain for one data word is initiated. If the previous output chain has not completed, output operations are halted and the error condition is reported to the Built-In Test function. When an output complete interrupt is generated, the output chain has completed.

(2) In the transmit state:

When the Prepare to Transmit-Roll Call or the Prepare to Transit-Broadcast request is received an External Function (Code 5 or 7, respectively) is sent to the NTDS computer 14 and a 10 ms. timeout requested. When the Reset request is received an External Function (Code 2) is sent to the NTDS computer 14.

When the timeout expired notice is received and the External Function was accepted by the NTDS computer, an input chain for one data word is initiated and the data available indicator set to true. If the External Function was not accepted the error condition is reported to the Built-In Test function and the data available indicator set to false.

When an input comlete interrupt is generated, the data available condition is set. When the next word request is received and data is available, an input chain for one data word is initiated, the data available indicator is set to true, and the received data word is routed to the EDAC Encoding function. When the next word request is received and data is not available, the data available indicator is set to false.

In the receive state, the output of this function is one of the following:
a. An External Function code to the NTDS computer 14.
b. The initiation of an output chain for the NTDS channel.
c. An output error notification to the Built-In Test function.

In the transmit state, the output of this function is one of the following:
a. An External Function code to the NTDS computer 14.
b. The initiation of an input chain for the NTDS channel.
c. A timeout request to the Executive function.
d. A 24-bit data word to the EDAC Encoding function.
e. A data available indicator, having the value true or false, to the Link Control function.
f. An input error notification to the Built-In Test function.

Radio Set Input/Output

Timing for the PDTS is based upon a precise frequency standard in the Radio Set Interface hardware. A count is taken from the frequency standard every 1/7040 of a second. During transmission D/A conversions are coincident with these counts. During listening and reception complex A/D samples are obtained from both sidebands every alternate count. Thus D/A conversions are accomplished at 7040 Hz rate while A/D conversions are accomplished at a 3520 Hz rate.

The transmit frame transition used by each Picket Station is based upon the received frame transitions detected during the Net synchronization transmission from the NCS, and is advanced by twice the propagation delay for the approximate distance to the NCS. Frame transitions should then be received at the NCS at the same time as its own transmit frame transitions. This synchronization is maintained until the next net synchronization transmission. Frame transitions detected during reception of other than net synchronizations pertain only to the message sequence being received. Receive frame transitions are used to synchronize the receiving station with the particular transmitting station during only that message sequence.

The timing of output to the Radio Set Interface (transmit frame transitions) is indirectly derived from the frequency standard in the Radio Set Interface hardware and not from an internal clock in the CPU of the PDTS. The receive input complete interrupt serves as the means by which precise time intervals are used to effect the necessary timing for output.

The data terminal operates in one of three states: idle, receive or transmit. This function is responsible only for the transition from the idle state to the receive state and the transition from either the receive or transmit states to the idle state. The transitions between the receive and transmit states, in response to link activity, are dictated by the Link Control function.

While the data terminal is in the transmit state, the transmitted audio signal is monitored on one of the receive sidebands to detect any discrepancies between the data word provided to the data terminal for modulation and the actual transmission. A Doppler correction is not applied and frame synchronization is taken from transmit frame transitions.

In the idle state, the input to this function is an initiate request from the Link Control function to begin input from the Radio Set Interface 18.

In the receive state, the input to this function is one of the following:
a. A frame transition value from the Frame Synchronization function indicating the position of a frame boundary.
b. A RCV input complete interrupt generated internally as the result of a specified number of words being received from the Radio Set Interface 18 on the USB or LSB channel.
c. A RCV missed data interrupt generated externally by the Radio Set Interface 18 indicating that the USB or LSB channel is not accepting data fast enough.
d. A terminate request from the Link Control function to place the data terminal in the idle state.

In the transmit state, the input to this function is one of the following:
a. A heder type value from the Link Control function indicating the type of header to be generated.
b. One set of 93 or 94 real values (Fast) or 154 or 155 real values (Slow) from the Header Generation function before transmitting data frames. Each value has an accuracy of 12 bits.
c. One set of 128 real values from the Signal Modulation function while transmitting data frames. Each value has an accuracy of 12 bits.

d. A XMT output complete interrupt generated internally as the result of a specified number of words being accepted by the Radio Set Interface 18 on the XMT channel.

e. A RCV input complete interrupt generated internally as the result of a specified number of words being accepted by the Radio Set Interface 18 on the selected monitor channel.

f. A RCV missed data interrupt generated externally by the Radio Set Interface 18 indicating that the selected monitor channel is not accepting data fast enough.

g. A terminate request form the Link Control function to place the data terminal in the idle state.

h. A XMT disable request form the Link Control function to disable the XMT channel.

This function controls the flow of data between the Radio Set Inerface 18 and the receive and transmit procesing functions. The processing performed by this function is in response to the particular input received and the data terminal state (1) In the idle state:

When an initiate request is received, an External Function code to disable both input channels (USB and LSB) and the output channel (XMT) is issued to the RSI 18. Input chains for the USB and/or LSB channels for thirty-two samples (2 words per sample) each are initiated to provide input buffers for the sampling process. An External Function code to enable the selected input channels is issued to the RSI to begin the sampling process which will continue until the data terminal reverts back to this state.

(2) In the receive state:

Two input buffers, one set for each sideband, are employed in a flip-flop manner to receive the incoming data samples from the RSI. Each buffer is 64 (Fast data rate) or 128 (Slow data rate) words in length. While one buffer is filling, the data in the other buffer is being processed. Whenever the filling process is completed, the roles of the two buffers are interchanged. Before frame synchronization is achieved the receipt of exactly 32 (Fast) or 64 (Slow) samples will complete the filling process.

After frame synchronization is achieved and until the end of the message sequence is detected, the receipt of an average of 46 14/15 (Fast) or 77 11/25 (Slow) samples from the center of each frame are retained in the buffers. For the Fast data rate this average results if one frame contains 46 samples, the next 14 frames each contain 47 samples, and the cycle repeats. For the Slow data rate this average results if, out of a 25-frame cycle, frames 1,3,5,7,9,10,12,14,16,18,19,21,23, and 25 contain 77 samples each and frame 2,4,6,7,11,13,15,17,20,22 and 24 contain 78 samples each. Regardless of the state of frame synchronization, the receipt of every group of 32 (Fast) or 64 (Slow) samples from the RSI in an interrupt that is used for timing purposes.

When a frame transition value is received and the data terminal is in the Net Sync mode, the position of the first XMT frame transition in relation to the next received 32 (Fast) or 64 (Slow) sample group is established. This occurs only at a Picket Station. When the data terminal is not in the Net Snyc mode, the position of the first RCV frame transition in relation to the next received 32 (Fast) or 64 (Slow) sample group is used to dalculate the positon of the last sample of the center 0.09 ms. (Fast) or 18.18 ms. (Slow) of each 13.3 ms. (Fast) or 22 ms. (Slow) frame interval. The position of the last center sample is established as the next RCV frame transition minus seven samples. This occurs at both the NCS and Picket Stations.

When a RCV input complete interrupt occurs and frame synchronization has not been achieved (RCV Processing Index >2), the input buffers are switched, the one or two sets of thirty-two samples received are routed to the Signal Demodulation function, and input chains for the USB or LSB for thirty-two additional samples are initiated. For the Fast data rate, the position of the next XMT frame transition in relation to the next thirty-two sample group, at the average of 46 14/15 (Fast) or 77 11/25 (Slow) samples per frame, is calculated only if the current one was received in this input. For the Slow data rate, the position of the next XMT frame transition is calculated only if the current one was received in this input and this input represents the last thirty-two samples of a sixty-four sample group.

When a RCV input complete interrupt occurs and frame synchronization has been achieved (RCV Processing Index >2), the processing criteria is based on whether the last sample input corresponds to the end of the buffer and/or corresponds to the position of the last center sample.

When the condition is end of the buffer, the position of the next XMT frame transition in relation to the next received 32 (Fast) or 64 (Slow) sample group, is calculated only if the current one was received in this input. If the last center sample will be contained within the next received 32 (Fast) or 64 (Slow) sample group, input chains for the USB and/or LSB channels starting at the beginning of the buffers are initiated for samples up to and including the one that corresponds to the last center sample. Otherwise, input chains for the USB and/or LSB channels for 32 (Fast) or 64 (Slow) samples are initiated.

When the condition is last center sample, the buffers are switched and input chains for the USB or LSB channels starting at the buffer position one past the last center sample that caused the interrupt are initiated for the samples remaining in the current 32 (Fast) or 64 (slow) sample group. The sets of 32 (Fast) or 64 (Slow) retained samples for one or both sidebands are routed to the Signal Demodulation function. The position of the last center sample in relation to the next received 32 (Fast) or 64 (Slow) sample group is also calculated.

Whenever an input chain is initiated, a new timeout is requested for the channel and the previous one cancelled. The expiration of the timeout indicates a channel malfunction and is reported by the Executive function directly to the Built-In Test function.

When a RCV missed data interrupt occurs, the input chain for the channel is halted, the channel disabled, and an error notification routed to the Built-In Test function. This function will continue to send samples to the Signal Demodulation function for this channel, coincident with the samples for the other channel, but they will all have zero value.

When a terminate request is received all input/output chains are halted, both RCV and the XMT channels are disabled, and the data termimal is placed in the idle state.

(3) In the transmit state:

Two output buffers are employed in a flip-flop manner to transmit the outgoing real data values to the RSI. Each buffer is 128 words in length. An average of 93 13/15 values per trasmitted frame, of the 128, are used for output in the Fast data rate. All 128 values are used at least once and some are used twice for output of an average of 154 22/25 values per transmitted frame in the Slow data rate. For the Fast data rate this average results if, out of a 15-frame cycle, frames 1 and 9 contain 93 values each and all other frames contain 94 values each. For the Slow data rate this average results if, out of a 25-frame cycle, frames 1, 10, and 18 contain 154 values each and all other frames contain 155 values each. This averaging process is begun for each transmitted header sequence and maintained until the end of the message sequence.

The header type input value specifies one of three header frame sequences generated from pre-stored tables: (1) A continuous series of alternating even and odd preamble frames for the Net Sync mode; (2) A six frame sequence consisting of five alternating even and odd preamble frames and a phase reference frame for a NCS Call-Up transmission; (3) An eight frame sequence consisting of five alternating even and odd preamble frames, a phase reference frame, and a two frame start code sequence for all other transmissions.

The frame type value sent to the Header Generation function specifies which type of frame to generate; a value zero for an even preamble frame, a one for an odd preamble frame, a two for a phase reference frame, a three for the first start code frame, and a four for the last start code frame. The frame indicator indentifies the characteristic of the header frame; FIRST signifies initialization of the generation process, LAST signifies the generation of initial phase references for the message encoding process is required, and INTERMEDIATE signifies neither FIRST nor LAST.

When a header type value is received, the averaging process of 93 13/15 (Fast) or 154 22/25 (Slow) values per transmitted frame as described above, is begun. Frame type has the value zero to generate an even preamble frame, the variable number of values is set to 93 (Fast) or 154 (Slow), and the frame indicator has the value FIRST. These values are sent to the Header Generation function to generate the values for the first header frame. The header type value is saved for generating the remainder of the header.

The next step is to determine the time at which to issue notification to the RSI to begin its present delay, nominally 10 ms., after which it will begin transmitting values. At a Picket station, this time will be the next XMT frame transition minus the preset delay of the RSI. At the NCS during other than Net Sync mode, this time will be the next XMT frame transition minus the preset delay of the RSI. At the NCS during Net Sync mode, this time will be the receipt of the last sample of the next 32 (Fast) or 64 (Slow) sample group. This time will be advanced to the next XMT frame transition if there is insufficient time for the necessary delay.

The last step is accomplished by generating an input chain for the monitor channel to interrupt at the desired time and then to complete its normal filling procedure. This action will be transparent to the RCV processing of the monitor channel.

When a set of values is received from the Header Generation function, an output chain for the number of values received is prepared for the XMT channel but not issued at this time. If there are more header frames to be generated, the Header Generation function is requested to generate the next frame using the continuing average of 93 13/15 (Fast) or 154 22/25 (Slow) values per transmitted frame. If the last header frame was generated, a header complete notification is sent to the Link Control function.

When a set of 128 values is received from the Signal Modulation function, the number of values output to the RSI will be at the continuing average of 93 13/15 (Fast) or 154 22/25 (Slow) values per transmitted frame. To maintain frame-to-frame coherence, the first value to be output from this set is taken as the value that is one past (modul 128) the last value output from the previous set. For the first data frame, this is taken as the first value of the set. Successive values are selected for output from the set from this starting point until either the number of values is satisfied or the end of the set is reached. If additional values are required, they are selected starting with the first value of the set. An output chain to reflect the selected values is prepared for the XMT channel but not issued at this time.

When a XMT output complete interrupt occurs, the previously prepared output chain is now initiated and the buffers switched unless: (1) A terminate request is pending; (2) a XMT disable request is pending; (3) The last two frames transmitted at the NCS were an address code in Roll Call mode or a control stop code in Net Test, Broadcast, or Short Broadcast modes; (4) The last two frames transmitted at the Picket station were a picket stop code. In cases (3) and (4) an External function code to disable the XMT channel is issued to the RSI 18.

When a RCV input complete interrupt for the monitor channel occurs, the processing performed is the same as for the RCV state described above unless the interrupt is the signal to begin transmitting. In this case, an External Function code to enable the XMT channel is issued to the RSI 18 to begin its preset delay. The output chain for the first header frame previously prepared is now initiated to provide the data values.

Whenever an output chain is initiated, a new timeout is requested for the channel and previous one cancelled. The expiration of the timeout indicates a channel malfunction and is reported by the Executive function directly to the Built-In Test function.

When a RCV missed data interrupt for the monitor channel occurs an error notification is routed to the Built-In Test function.

When a terminate request is received, all input/output chains are halted, the XMT and RCV channels are disabled, and the data terminal is placed in the idle state.

When a XMT disable request is received, an External Function code to disable the XMT channel is issued to the RSI.

The outputs of this function when the data terminal is in the idle state are:

a. An External Function code to disable both input channels and the output channel to the Radio Set Interface 18.
b. An External Function code to enable the USB and/or LSB input channels to the Radio Set Interface 18.
c. The initiation of input chains for the USB and/or LSB channels.

The output of this function when the data terminal is in the receive state is one of the following:

a. The initiation of input chains for the USB and/or LSB channels
b. One or two sets of 32 complex values representing the sampled data signal for the USB and/or LSB before frame synchronization has been achieved to the Signal Demodulation function every 9.09 ms. The real and imaginary parts of each complex value have an accuracy of 12 bits.

c. One or two sets of 32 (Fast) or 64 (Slow) complex values representing the sampled data signal for the USB and/or LSB after frame synchronization has been achieved to the Signal Demodulation function every 13.3 ms. (Fast) or 22 ms. (Slow). The real and imaginary parts of each complex value have an accuracy of 12 bits.

d. An error notification for missed data on the USB or LSB channel, to the Built-In Test function.

d. A timeout request for the USB and/or LSB channels to the Executive function.

The output of the function when the data terminal is in the transmit state is one of the following:

a. The initiation of input chains for the monitor channel.
b. The initiation of output chains for the XMT channel.
c. A frame type value, a number of values to generate, and a frame indicator value to the Header Generation function.
d. One set of 32 complex values representing the sampled data signal for the monitor channel until signal presence is detected to the Signal Demodulation function every 9.09 ms. The real and imaginary part of each complex value have an accuracy of 12 bits.
e. One set of 32 (Fast) or 64 (Slow) complex values representing the sampled data signal for the monitor channel after signal presence is detected to the Signal Demodulation function every 13.3 ms. (Fast) or 22 ms. (Slow). The real and imaginary parts of each complex value have an accuracy of 12 bits.
f. A header complete notification to the Link Control function.
g. An error notification, for missed data on the monitor channel, to the the Built-In Test function.
h. A timeout request for the XMT channel to the Executive function.

Man/Machine

The Man/Machine function performs the interface between the system operator and the data terminal. The data terminal is initialized by input from the Alphanumeric Digital Display device 22. Data terminal status and error messages are communicated to the operator by output to the ADD. Special function keys on the ADD are used to initiate transmissions, to terminate transmissions and place the data terminal in the listening mode, to start net operation using the previously entered configuration parameters and addresses, and to stop net operation. The display allows the operator to observe the parameters that have been set, the current operation and performance of the data terminal, and at the NCS, the performance of the net.

The input of this function is one of the following:

a. An initialize request from the Loader function to initiate Man/Machine communications.
b. An External Interrupt generated as the result of depressing one of the seven function keys on the ADD console referred to as F1 through F7.
c. An External Interrupt generated as the result of a memory overflow or parity error condition in the ADD.
d. An input complete interrupt as the result of a specific number of words being received from the ADD.
e. A status value and item indicator from the Link Control, Frame Synchronization, Message Decoding, or Control Code Recognition function.
f. An accepted/missed address from the Link Control function only at the NCS.
g. An output complete interrupt as the result of a specific number of words being accepted by the ADD.
h. An error message from the Built-In Test function.
i. A timeout notification from the Executive function.

This function performs all communications between the Programmable Data Terminal Set program and the system operator.

When an initialize request is received from the Loader function, the ADD screen is cleared and the following format is displayed.

```
         "PDTS PROGRAM
PRESS:   F3 TO SELECT MAINTENANCE MODE
         F4 TO SELECT ON-LINE MODE
         F5 TO RETURN TO THIS MODE"
```

While this display is on the ADD, only F3 or F4 interrupts are accepted (see Table VI). All other inputs from the ADD are rejected by a message to the operator. When an F5 interrupt occurs, the initialization process is repeated.

When an F4 interrupt occurs, the ADD screen is cleared and the On-Line format, FIG. 3-26 is displayed. The display is divided into four areas: one for configuration parameters altered only by the operator; one for status indicators altered only by the data terminal; one for the address array altered by both the operator and the data terminal; and one for error, acknowledgement, or rejection messages. The definition of the items shown, and their possible values is presented in Table VII below, with the exception of SIG QUAL which is defined below in the processing of status value inputs. The values shown for configuration parameters are the default values initially displayed. The entire display, except for configuration values, 62 address values, and the bottom line are memory protected to prevent the alteration of values that can only be changed by the data terminal. If the program is restarted, the values remain those selected prior to stopping the program. A one character input chain is initiated to accept input from the operator and the data terminal is now in the On-Line mode. While in this mode, or Maintenance mode described below, only function key 1,2,5, and 6 interrupts are acceptable (see Table VI). All other function key interrupts are rejected with message to the operator.

When an F3 interrupt occurs, the operator has selected the off-line Maintenance mode. Refer to the Link Control function, paragraph 3.4.1.4. The On-Line format is displayed, as described above, with the addition of "TEST MD" displayed with emphasis in the configuration area and a "1" displayed directly below it to specifiy a test number that is altered by the operator. The processing performed by this function in the Maintenance mode is functionally identical to the On-Line mode.

When an ADD input complete interrupt occurs, the cursor position is read, the character just received is emphasized on the ADD display, and another one character input chain is initiated. The cursor position is translated into a configuration parameter, an address parameter, or the first character position of the bottom line. When the character received is a configuration parameter and there are insufficient characters to determine the validity of the input for this parameter, no further processing for this input is performed. If sufficient characters have been received to determine that the input is invalid, the current value is re-displayed and the input is rejected by a message to the operator. If sufficient characters have been received to determine that the input is valid, the characters are de-emphasized, the value entered into the list of configuration parameters, and the input acknowledged by a message to the operator. The value received for the RNG parameters is an ASCII (American Standard Code for Information Interchange) decimal character string in increments of 25 to a maximum of 750. The character string is converted to binary prior to being entered into the list of configuration parameters.

When the character received is an address parameter and the two characters received represent two ASCII octal digits, between 01 and 76$_8$, the two characters are de-emphasized, the binary value entered into the address list, and the input acknowledged by a message to the operator. When the character received is an ASCII "*", in the position following an address parameter, this parameter is taken as the ownship address. The 60-bit code corresponding to this address, from Table II, is sent to the Control Code Recognition function, the character de-emphasized, and the input acknowledged by a message to the operator. At a Picket Station, only one address parameter, ownship is accepted. At the NCS, up to 62 address parameters are accepted, the last of which is the ownship address. Any illegal input results in the parameter field being blanked, the cursor positioned to the first character of the field, and the input rejected by a message to the operator.

When the character received is the first character position of the bottom line, this line is cleared.

When an F1 interrupt occurs, a XMT INITIATE is sent to the Link Control function. When an F2 interrupt occurs, a XMT RESET is sent to the Link Control function. When an F5 interrupt occurs, a stop program request is sent to the Executive function and the processing for an initialize request input is performed to re-enter the Loader mode. When an F6 interrupt occurs, a start program request is sent to the Executive function. The acceptable interrupts just described are acknowledged by a message to the operator. All other function key interrupts are rejected by a message to the operator. When an External Interrupt for an ADD memory overflow or parity error occurs, an error notification is sent to the Built-In Test function to record the error, and the appropriate error message from Table VIII is displayed to the operator. Insofar as possible, net operations will continue.

When a status value is received and the item indicator is for XMT MODE, RCV MODE, or NET BUSY an "X" is displayed when the value is ON and a blank displayed when the value is OFF. When the item indicator is for XMT DATA ERR, RCV DATA ERR, or CODE ERR an "X" is displayed for at least one second. When the item indicator is for SYNC an "X" is displayed until the next net synchronization. When the item indicator is for SIG QUAL, the SNR value received is converted to a display character as follows:

| SNR | Character | Meaning |
| --- | --- | --- |
| ≧100 | E | Excellent |
| <100 and ≧32 | G | Good |
| <32 and ≧10 | F | Fair |
| <10 and ≧1 | P | Poor |
| <1 | N | No Signal |

The NCS display indicates that a Picket Station accepted a call by a blank in the third character position of the address field. A missed picket call is shown by the character "M" being displayed in the third character position. At the NCS or a Picket Station, its own address is emphasized while ownship transmissions are being made on the link. At the NCS, the address of a picket is emphasized from the time that the NCS calls that address until the call is considered either accepted or missed.

The completion of an output buffer to the ADD results in an output complete interrupt. As a result, the timeout that was requested for the previous output buffer is cancelled by sending a timeout request, with a null value, to the Executive function. If an output buffer had been prepared prior to the completion of the current one, it is initiated at this time with a new timeout request.

When an error message is received from the Built-In Test or Executive function, the bottom line of the ADD display is cleared and the received characters are displayed on this line.

To indicate that communication exists between the computer and the ADD, the character "S" of the word STATUS in the On-Line or Maintenance displays or the character "P" of the word PDTS in the Loader display is alternately emphasized or de-emphasized approximately once per second. This process is started by sending a one second timeout request to the Executive function which will then return timeout notifications approximately once per second for as long as the computer is running.

The outputs of this function is one of the following:
a. The initiation of output chains to the ADD.
b. The initiation of input chains to the ADD.
c. A 60-bit ownship address code to the Control Code Recognition function.
d. A XMT INITIATE/RESET to the Link Control function.
e. A start/stop program request to the Executive function.
f. A timeout request to the Executive for an output operation.
g. A one second timeout request to the Executive function.
h. An error notification to the Built-In Test function.

The basic sequence of steps taken by the operator to start the PDTS program, to select either the On-Line or Maintenance mode of operation, and to effect the operation of either program mode is as follows:

Step 1. The operator presses the Bootstrap Loader button on the computer 12 to load the PDTS program.

Step 2. The Loader display is on the ADD 22. The operator can then:
a. Press F4 to enter the On-Line program mode (Step 3).
b. Press F3 to enter the Maintenance program mode (Step 4).

Step 3. The On-Line display is on the ADD 22. The operator can then:
a. Change configuration parameters from the ADD console 22.
b. Enter addresses from the ADD console 22.
c. Press F6 to start program operation.
d. Press F1 to indicate XMT INITIATE.
e. Press F2 to indicate XMT RESET.
f. Press F5 to stop program operation and return to the Loader mode (Step 2).

Step 4. The Maintenance display is on the ADD 22. The operator can then:
a. Change configuration parameters, particularly TEST MD, from the ADD console 22.
b. Press F6 to start program operation.
c. Press F1 to start the selected test.
d. Press F2 to stop the selected test.
e. Press F5 to stop program operation and return to the Loader mode (Step 2).

Table VI

| | ADD External Interrupt Table | |
|---|---|---|
| External Interrupt | Loader Mode | On-Line or Maintenance Mode |
| F1 Key | (Illegal) | XMT INITIATE |
| F2 Key | (Illegal) | XMT RESET |
| F3 Key | Select Maintenance Mode | (Illegal) |
| F4 Key | Select On-Line Mode | (Illegal) |
| F5 Key | (Illegal) | Terminate Program |
| F6 Key | (Illegal) | Start Program |
| F7 Key | (Illegal) | (Illegal) |
| Memory Overflow | Error | Error |
| Parity | Error | Error |

Table VII

| Data Terminal Set Controls or Indicators | |
|---|---|
| Control or Indicator | Function |
| Transmit Mode Indicator (XMT MD) | Indicates that the terminal is in the transmit mode. An "X" indicates that the transmit start signal has been sent and the transmit stop signal has not subsequently been sent. |
| Receiver Mode Indicator (RCV MD) | Indicates that the terminal is in the receive mode. An "X" indicats that a start code has been received and a stop code has not subsequently been received. |
| Doppler Correction | An "X" indicates that the Doppler correction logic is enabled. |
| Sideband Select (SB SEL) | "LSB" indicates that terminal is restricted to lower sideband signal. "USB" indicates that terminal is restricted to upper sideband signal. "DIV" indicates that the upper and lower sidebands signals will be combined. "AUTO" indicates that the sideband (LSB, USB, or DIV) with the highest received signal quality will be selected. |
| SYNC Mode (SYNC MD) | "F" indicates that only fast received data synchronization is enabled. Synchronization occurs only during the five frame period. "C" indicates that only continuous data synchronization is enabled. Synchronization occurs during the data portion of the message. "F/C" indicates that both fast and continuous data synchronization are enabled. "I" indicates that both fast and continuous synchronization are inhibited. |
| XMT DATA ERR | An "X" indicates that an error in transmitted data has been detected. |
| RCV DATA ERR | An "X" indicates that an error in received data has been detected. |
| CODE ERR | An "X" indicates that an error has been detected in a received control code. |
| NET BUSY | An "X" indicates that the link is active. If own station is a picket, the "X" means that a picket is transmitting or that net control is communicating with another picket in the net. If own station is net control, the "X" signifies that net control has interrogated a picket and is awaiting a response or that net control is communicating with a picket. |
| SYNC Comp | An "X" indicates synchronization with Net Control Station has occurred. The "X" is never shown at the Net |

Table VII-continued

Data Terminal Set Controls or Indicators

| Control or Indicator | Function |
| --- | --- |
| Operate (OP) | Control Station. "O" indicates normal transmit and receive function. "S" indicates radio silence. The transmit function keyline is disabled. |
| Net Control (NET CONT) | "NCS" indicates net control station terminal of operation. "PKT" indicates picket station terminal operation. |
| ERR CORR | "C" indicates that errors will be corrected in received data. Single bit errors are corrected. "L" indicates that errors will not be corrected. Instead received data is labeled to indicate whether or not it contains errors. |
| Trans Init | Single action to initiate Net Control Station transmission in the Roll Call mode. In other modes, transmission is initiated. |
| NET MODE | "BC" indicates this station acting as picket or net control will transmit a continuous series of broadcasts to all members of the net. "SBC" indicates that this station acting as picket or net control will send a short broadcast (single data transmission) to all members of the net. "RC" indicates Roll Call mode. The net control station will automtically interrogate each picket in turn. "NS" enables the Net Control Station to transmit continuous net synchronization messages. "NT" enables the Net Control Station to transmit a known pattern for net test. The received pattern is compared with the known test pattern independently generated by the data terminal. |
| TIMING STORED (TIME STR) | "STR" enable use of stored timebase obtained during net sync mode of operation. "COR" enables correction of timebase each time own station address is recognized by a picket station in Roll Call mode. (A picket station which has not established sync during net sync can communicate only in this type of timing.) |
| TRANSMIT RESET | Single action which terminates a transmission in progress, places the Data Terminal Set in the Receive mode, and clears link control logic. |
| DATA RATE | "F" indicates the fast data rate of 2250 BPS. The data frame interval is approximately 13.3 msec. "S" indicates the slow data rate of 1364 BPS. The data frame interval is approximately 22 msec. |
| RNG | Selects the range in miles between net control and own station. Setting alters transmit frame timing to compensate for signal propagation delay. |
| Address Array | The addresses of all participating units in the net are displayed in this array on NCS. A maximum of 62 addresses may be entered. Own station address is indicated by an asterisk. Missed calls are indicated by an "M" next to the picket address of the unit which does not respond after two succesive interrogations. |
| SIGNAL QUALITY | A relative measure of received |

Table VII-continued

Data Terminal Set Controls or Indicators

| Control or Indicator | Function |
|---|---|
| | signal-to-noise ratio. |

Table VIII

Error Messages

| Number | Message Displayed | Source | Meanind |
|---|---|---|---|
| 1 | NTDS FAILED TO RECEIVE | NT | NTDS did not accept a received data word prior to the time that the following word was sent to NTDS. |
| 2 | NTDS FAILED TO RESPOND TO INTERRUPT | NT | NTDS did no accept an interrupt within the allotted time period. |
| 3 | NTDS FAILED TO TRANSMIT | LC | NTDS did not send any data in response to a Prepare to Transmit interrupt two consecutive times. |
| 4 | CONTROL STOP RECEIVED | LC | NCS received a control stop. code. |
| 7 | NET TEST ERROR | CR | An error in received data duting Net Tesr has been detected. |
| 9 | ADD MEMORY OVERFLOW | MM | The "memory overflow" interrupt has been received from the ADD. |
| 10 | ADD PARITY ERROR | MM | The "parity error" interrupt has been received from the ADD. |
| 11 | ADD FAILED TO ACCEPT DATA | MM | ADD failed to accept an output buffer in the allotted time. |
| 12 | ILLEGAL ACTION | MM | The operator has requested an action that cannot be performed. |
| 13 | RSI LOST DATA XXX | RS | The "missed data" interrupt has been received. XXX = USB or LSB. |
| 14 | RSI NO DATA RECEIVED XXX | EX | An input buffer did not complete in either: 9.09 ms.-before Frame Sync 13.3 ms.-Fast, after Frame Sync 22 ms.-Slow, after Frame Sync XXX = USB or LSB |
| 15 | RSI FAILED TO TRANSMIT | EX | An output buffer did not complete in either: 13.3 ms.-Fast 22 ms.-Slow |
| 16 | RSI FAILED TO KEY TRANSMITTER | EX | The EF word was not accepted by the RSI in the allotted time. |
| 17 | UYK-20 POWER FAULT | BT | The Power Fault interrupt has been received. |
| 18 | UYK-20 MEMORY RESUME | BT | The Memory Resume interrupt has been received. X = the module number. |
| 19 | UYK-20 INSTRUCTION FAULT | BT | The CPU Instruction Fault interrupt has been received. |
| 20 | UYK-20 I/O CHAIN INSTRUCTION FAULT XXX CHAN Y | BT | The I/O Chain Instruction Fault interrupt was received. XXX = IN or OUT. Y = channel number. |
| 21 | UYK-20 INTERCOMPUTER TIMEOUT | BT | The Intercomputer timeout interrupt was received. |
| 22 | UYK-20 FAILED INSTRUCTION TEST OP CODE X | BT | The background instruction test failed. X = OP code(s) that failed. |
| 23 | OFF-LINE MAINTENANCE TEST FAULT X FRAMES SENT | LC | The off-line maintenance test program detected an error. X = the number of successful frames. |

Built-In Test

The Built-In Test function is the focal point of all errors in the data terminal system. The operator is notified of net processing errors as well as internal and external hardware failures. The status of the internal hardware is monitored by periodically executing a test instruction set and recognizing certain Class I, II, and III internal interrupts. The status of the external hardware is monitored by the Executive function which performs timeouts on I/O operations with peripheral equipment. Any hardware error signifies a computer problem that is isolated and corrected in an off-line mode.

The input to this function is one of the following:
a. An instruction test request from the Executive function.
b. An internal interrupt generated as the result of a Power Fault, Memory Resume, CP Instruction Fault, I/O Chain Instruction Fault, or Intercomputer Timeout.
c. An error notification from the NTDS Input/Output, Link Control, Message Decoding, Control Code Recognition, Man/Machine, Radio Set Input/Output or Executive function.

This function tests the CPU instruction set, generates messages for error conditions detected internally or by other functions, and records all error conditions.

When an instruction test request is received a set of test instructions, using prestored input values, is executed and the results compared with prestored output values. If errors are found they are recorded in an internal list, error message number 22 of Table VIII is sent to the Man/Machine function for display to the operator, a terminate request is sent to the Link Control function, and a test failure indication sent to the Executive function. If no errors are found a test success indication is sent to the Executive function. The set of instructions tested are a representative set of CP and IOCP instructions.

When an internal interrupt occurs, the necessary actions to resume control and identify the specific error condition are performed. The appropriate error message from Table VIII is sent to the Man/Machine function, and the error recorded.

When an error notification is received from another function, it is recorded and the appropriate error message from Table VIII is sent to the Man/Machine function. A terminate request is sent to the Link Control function for error message numbers 1,2,3,9,10,11, and 13 through 22. A terminate request is not sent for error number 13 when the channel for which data was lost is not the monitor channel.

The outputs of this function are either:
a. A test success indication to the Executive function.
Or:
a. A test failure indication to the Executive function.
b. An error message to the Man/Machine function.
c. A terminate request to the Link Control Function.
Or:
a. An error message to the Man/Machine function and possibly a terminate request to the Link Control function.

Executive

The Executive function provides the necessary control and timing services to the other processing functions of the data termina. It sequences the execution of the processing functions, initiates and terminates On-Line or Maintenance operation, and maintains the Real-Time and Monitor clocks to time input/output operations and other events.

The input to this function is one of the following:
a. A start program request from the Man/Machine function as the result of function key 6 being depressed by the operator.
b. A stop program request from the Man/Machine function as the result of function key 5 being depressed by the operator.
c. A timeout request from the Radio Set Input/Output, NTDS Input/Output, or Man/Machine function for an input/output operation.
d. A timeout request from the Link Control function for an event timer.
e. A one second timeout request from the Man/Machine function.
f. A test success/failure indication from the Built-In Test function.

This function sequences the execution of functions, initiates and terminates net operation, and services timeout requests.

When a start program request is received from the Man/Machine function, an initiate request is sent to the Link Control function to start net operation under the current system parameters, the Monitor clock is enabled to service timeout requests, the Real-Time clock is enabled to service one second interval requests, and the necessary interrupts are enabled to begin program operation. At this time the Executive will assume the responsibility for the sequencing of the execution of the other processing functions of the program. In the receive state, the switching of input buffers by the Radio Set Input/Output function signals that data is ready to be processed by the receiving functions. In the transmit state, the switching of output buffers signals that new data is to be prepared by the transmission functions and the data received on the monitor channel is ready to be processed by the monitor functions. When a processing cycle is complete and no more often than every thirty seconds, an instruction test request is sent to the Built-In Test function when an address code (ownship or other) is received at a Picket Station or after an address code has been transmitted at the NCS.

When a stop program request is received from the Man/Machine function, a terminate request is sent to the Link Control function to cease net operation, the Monitor and Real-Time clocks are disabled, and the sequencing of function execution is halted.

All timeout requests include a function identifier. When a timeout request is received, any current timeout for the same function is cancelled and a new timeout period is started. If a timeout period expires for an input/output operation, there has been a peripheral equipment malfunction and an error notification is sent to the Built-In Test function. If a timeout period expires for the event timer, a timeout notification is sent to the Link Control function.

When a one second timeout is received from the Man/Machine function the value of the Real-Time clock is saved. Periodically the Real-Time clock will be checked to determine if at least one second has elapsed since the clock value was saved. When at least one second has elapsed, a timeout notification is sent to the Man/Machine function and the current clock value saved to start a new timeout.

When a test success indication is received from the Built-In Test function, normal function execution and processing continues. When a test failure indication is received, the same steps as result from a stop operations input are performed.

The output of this function is one of the following:
a. An initiate request to the Link Control function to start net operation.
b. A terminate request to the Link Control function to cease net operations.
c. A timeout notification to the Link Control, NTDS Input/Output, or Man/Machine function.
d. An error notification to the Built-In Test function.
e. An instruction test request to the Built-In Test function.

Loader

The Progammable Data Terminal Set program is written on a magnetic tape in a format compatible with the hardware bootstrap loader of the AN/UYK-20. The loader program is automatically entered following a successful load of the program.

The only input to this function is transfer of control from the hardware bootstrap loader.

This function loads the PDTS program for a magnetic tape. When a transfer of control is received from the hardware bootstrap loader, the PDTS program records are loaded from magnetic tape into core memory. If the load is unsuccessful the operator is notified by an indication on the computer 12 Maintenance Panel, and the computer stops. If the load is successful, the computer is in the Run mode, and an initialize request is sent to the Man/Machine function.

The outputs of this function is one of the following:
a. An indication of an unsuccessful program load to the operator.
b. An initialize request to the Man/Machine function.

An estimate of the processing times achievable by utilization of the programming specifications disclosed above is given in the table of FIG. 11.

Obviously many modifications and variations of the present invention are possible in the light of the above teachings. It is therefore to be understood that within the scope of the appended claims the invention may be practiced otherwise than as specifically described.

We claim:

1. A system for generating audio signals representative of the digital data output from a digital computer data source to be transmitted in a computer-to-computer radio data link comprising:
a general purpose digital computer being programmed for (1) receiving a plurality of data frames from a digital computer data source, each said frame including a predetermined number of data bits, (2) adding a predetermined number of Hamming code parity check bits for each said data frame, (3) converting each bit-pair of each said data frame into a predetermined phase shift complex value and computing a Doppler tone phase complex value, (4) converting all of said predetermined phase shift complex values into a sequence of real sample values for generation of an audio signal, and (5) determining the correct time to transmit data; and
interface means operably coupled to said general purpose digital computer for receiving said sequence of real sample values and for producing audio signals therefrom representative of the data in said data frame.

2. The system of claim 1 wherein said interface means comprises a digital-to-analogue converter connected to a low pass filter.

3. The system of claim 1 wherein said general purpose digital computer is further programmed for controlling the transmission of header information.

4. The system of claim 1 wherein each of said predetermined number of data bits from a word and wherein said program for adding a predetermined number of Hamming code parity check bits includes ANDING each of a plurality of bit patterns with each said word and determining the complement of the parity of each resulting word.

5. The system of claim 1 wherein said program for converting each bit pair of each said data frame into a predetermined phase shift complex value performs the computation $(1-2b_1)(3-2b_0)45°$ where $b_0$ is the value of the even numbered bit and $b_1$ is the value of the odd number bit in each of said bit-pairs.

6. The system of claim 5 wherein said program for converting all of said predetermined phase shift complex values into a sequence of real sample values for generation of an audio signal incorporates the computation of an Inverse Fast Fourier Transform for computation of said sequence of real sample values.

7. The system of claim 1 wherein said general purpose digital computer is further programmed to inhibit the receipt of data thereby from said digital computer data source on the occurrence of a predetermined condition.

8. The system of claim 1 further comprising:
a radio set operably coupled to said interface means for transmitting said audio signals.

9. In a system for transmitting data by means of a radio link between a plurality of digital data computers including a plurality of radio sets each being associated with one of said digital data computers for transmitting and receiving data signals, the improvement comprising:
a plurality of general purpose digital computers each being operably coupled to one of said plurality of digital data computers and each being programmed for controlling the transmission and reception of digital data between said plurality of digital data computers and for processing the data outputs of the one of the plurality of digital data computers operably coupled thereto and for producing a sequence of digital sample values for generation of an audio signal; and
a plurality of interface means each being operably coupled to the output of one of said plurality of general purpose digital computers and to the input of one of said plurality of radio sets for receiving said digital sample values, for converting said digital sample values to audio signals for transmission, for receiving real valued audio signals from said one of said plurality of radio sets operably coupled thereto and for converting said real valued audio signals into corresponding digital values.

10. The system of claim 9 wherein each of said interface means comprises a transmission section including a digital-to-analogue converter coupled to the output of said one of said plurality of general purpose digital computers and a low pass filter coupled to the output of said digital-to-analogue converter; and
a reception section including first means for receiving an upper sideband and a lower sideband audio signal from the one of said plurality of radio sets coupled thereto, second means coupled to said first means for converting each of said upper sideband and lower sideband signals into in-phase and quadrature phase signals; and
an analogue-to-digital converter coupled to said second means.

11. A system for receiving data in a computer-to-computer radio data link comprising:
interface means for receiving modulated radio signals representative of sampled data from a first computer, for producing in-phase and quadrature phase components therefrom and for analogue-to-digital converting said components to produce digital samples;
a general purpose digital computer operably coupled to the output of said interface means and being programmed for receiving said digital samples, for processing said digital samples to reconstruct said sampled data and for sending said reconstructed sampled data to a second computer.

12. The system of claim 11 wherein said interface means includes first and second means for receiving upper sideband and lower sideband audio signals, respectively;
first and second quadrature phase shift circuits connected to said first and second means for producing said in-phase and quadrature phase components for both of said upper sideband and lower sideband signals;

first, second, third and fourth sample and hold networks connected to the outputs of said first and second quadrature phase shift circuits;

a multiplexer connected to the outputs of said first, second, third and fourth sample and hold networks; and an analogue-to-digital converter connected to said multiplexer.

13. The system of claim 11 wherein said general purpose digital computer is programmed for demodulating said digital samples utilizing the Discrete Fast Fourier Transform.

14. The system of claim 13 in which said general purpose digital computer is programmed for adjusting the apparent Doppler shift introduced by said radio link.

15. The system of claim 13 in which said general purpose digital computer is programmed for recognition of control codes.

16. The system of claim 15 wherein said general purpose digital computer is programmed for Hamming decoding.

17. The system of claim 11 wherein said general purpose digital computer is programmed for inhibiting the sending of said reconstructed sampled data to said second computer on the occurrence of a predetermined condition.

18. A method of transmitting and receiving data between a plurality of digital computers by means of a radio link comprising the steps of:
 (1) connecting each one of a plurality of general purpose digital computers to one of said plurality of digital computers;
 (2) programming each of said general purpose digital computers to control the timing of data transfer between said plurality of digital computers;
 (3) programming each of said general purpose digital computers for converting the data received from the one of said plurality of digital converters connected thereto into a sequence of sample values to be used for generation of an audio signal transmitted over said radio link;
 (4) performing a digital-to-analogue conversion of said sequence of sample values to provide transmitter composite digitized audio tones;
 (5) filtering said transmitter composite digitized audio tones to provide composite audio tones representative of said data received;
 (6) transmitting and receiving said audio tones over said radio link;
 (7) deriving in-phase and quadrature phase component signals from the received audio tones;
 (8) performing an analogue-to-digital conversion of the derived in-phase and quadrature phase component signals to provide receiver composite digitized audio tones;
 (9) programming each of said general purpose digital computers for converting the receiver composite digitized audio tones into said data received from the one of said plurality of digital computers.

* * * * *